US011086298B2

(12) United States Patent
Chand et al.

(10) Patent No.: US 11,086,298 B2
(45) Date of Patent: Aug. 10, 2021

(54) SMART GATEWAY PLATFORM FOR INDUSTRIAL INTERNET OF THINGS

(71) Applicant: Rockwell Automation Technologies, Inc., Mayfield Heights, OH (US)

(72) Inventors: Sujeet Chand, Brookfield, WI (US); Joachim Thomsen, Krefeld (DE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 123 days.

(21) Appl. No.: 16/384,106

(22) Filed: Apr. 15, 2019

(65) Prior Publication Data

US 2020/0326684 A1 Oct. 15, 2020

(51) Int. Cl.
*G05B 19/4155* (2006.01)
*G06N 20/00* (2019.01)

(52) U.S. Cl.
CPC ......... *G05B 19/4155* (2013.01); *G06N 20/00* (2019.01); *G05B 2219/31348* (2013.01)

(58) Field of Classification Search
CPC ..................................... G06N 20/00
USPC ........................................ 700/275
See application file for complete search history.

(56) References Cited

U.S. PATENT DOCUMENTS

| | | |
|---|---|---|
| 6,202,038 B1 | 3/2001 | Wegerich et al. |
| 6,421,571 B1 | 7/2002 | Spriggs et al. |
| 8,031,638 B2 | 10/2011 | Ackermann et al. |
| 8,616,134 B2 | 12/2013 | King et al. |
| 8,674,993 B1 | 3/2014 | Fleming et al. |
| 8,812,684 B1 * | 8/2014 | Hood ............... H04L 51/24 709/227 |
| 8,967,051 B2 | 3/2015 | King et al. |
| 9,152,632 B2 | 10/2015 | Smith et al. |
| 9,329,751 B2 | 5/2016 | Bardhan |
| 9,346,371 B2 | 5/2016 | King et al. |

(Continued)

FOREIGN PATENT DOCUMENTS

| | | |
|---|---|---|
| CN | 103217935 A | 7/2013 |
| CN | 103685442 A | 3/2014 |

(Continued)

OTHER PUBLICATIONS

Leitao, et al. "Integration Patterns for Interfacing Software Agents with Industrial Automation Systems" IEEE 2018 #978-1-5090-6684-1/18 pp. 2908-2913. (Year: 2018).*

(Continued)

*Primary Examiner* — Md Azad
(74) *Attorney, Agent, or Firm* — Amin, Turocy & Watson, LLP

(57) ABSTRACT

A smart gateway platform leverages pre-defined industrial expertise to identify limited subsets of available industrial data deemed relevant to a desired business objective, and to collect and model this relevant data to apply useful constraints on subsequent artificial intelligence or machine learning analytics applied to the data. This approach can reduce the data space to which AI analytics are applied, and assist data analytic systems to more quickly derive valuable insights and business outcomes. In some embodiments, the smart gateway platform can operate within the context of a multi-level industrial analytic system, feeding pre-modeled data to one or more AI or machine learning systems executing on one or more different levels of an industrial enterprise.

20 Claims, 17 Drawing Sheets

(56) References Cited

U.S. PATENT DOCUMENTS

| | | | |
|---|---|---|---|
| 9,411,864 B2 | 8/2016 | Glinder et al. | |
| 9,645,979 B2 | 5/2017 | Shinzato | |
| 9,760,601 B2 | 9/2017 | Burke et al. | |
| 9,771,000 B2 | 9/2017 | King et al. | |
| 9,958,860 B2 | 5/2018 | Rischar et al. | |
| 10,048,995 B1 | 8/2018 | Dikhit et al. | |
| 10,112,777 B2 | 10/2018 | King et al. | |
| 10,442,637 B2 | 10/2019 | Huang et al. | |
| 2002/0029205 A1* | 3/2002 | Pedraza | G06N 20/00 706/21 |
| 2002/0077711 A1 | 6/2002 | Nixon et al. | |
| 2005/0187643 A1 | 8/2005 | Sayyar-Rodsari et al. | |
| 2006/0161597 A1 | 7/2006 | Ougarov et al. | |
| 2007/0094181 A1 | 4/2007 | Tayebnejab et al. | |
| 2007/0208549 A1 | 9/2007 | Blevins et al. | |
| 2008/0077512 A1 | 3/2008 | Grewal | |
| 2008/0082297 A1 | 4/2008 | Lundeberg et al. | |
| 2008/0114474 A1 | 5/2008 | Campbell et al. | |
| 2009/0089032 A1 | 4/2009 | Sturrock et al. | |
| 2009/0228176 A1 | 9/2009 | Mintah et al. | |
| 2010/0031199 A1 | 2/2010 | Birzer et al. | |
| 2010/0050097 A1 | 2/2010 | Mcgreevy et al. | |
| 2010/0292825 A1 | 11/2010 | Taylor et al. | |
| 2011/0261049 A1 | 10/2011 | Cardno et al. | |
| 2012/0022849 A1 | 1/2012 | Wang et al. | |
| 2012/0054650 A1 | 3/2012 | Bliss et al. | |
| 2012/0078432 A1 | 3/2012 | Weatherhead et al. | |
| 2013/0124465 A1 | 5/2013 | Pingel et al. | |
| 2013/0211555 A1 | 8/2013 | Lawson et al. | |
| 2013/0211870 A1 | 8/2013 | Lawson et al. | |
| 2013/0212420 A1 | 8/2013 | Lawson et al. | |
| 2014/0015671 A1 | 1/2014 | Zajac et al. | |
| 2014/0047107 A1 | 2/2014 | Maturana et al. | |
| 2014/0121789 A1 | 5/2014 | Brandes et al. | |
| 2014/0180644 A1 | 6/2014 | Maturana et al. | |
| 2014/0222522 A1 | 8/2014 | Chait | |
| 2014/0226460 A1 | 8/2014 | Kretschmann et al. | |
| 2014/0278312 A1 | 9/2014 | Nixon et al. | |
| 2014/0335480 A1 | 11/2014 | Asenjo et al. | |
| 2014/0336786 A1 | 11/2014 | Asenjo et al. | |
| 2014/0337000 A1 | 11/2014 | Asenjo et al. | |
| 2014/0337429 A1 | 11/2014 | Asenjo et al. | |
| 2015/0120009 A1 | 4/2015 | Killan | |
| 2015/0134400 A1 | 5/2015 | Kashi | |
| 2015/0199224 A1 | 7/2015 | Mihnev | |
| 2015/0277406 A1 | 10/2015 | Maturana et al. | |
| 2015/0281319 A1 | 10/2015 | Maturana et al. | |
| 2015/0281355 A1 | 10/2015 | Maturana et al. | |
| 2015/0281356 A1 | 10/2015 | Maturana et al. | |
| 2015/0281453 A1 | 10/2015 | Maturana et al. | |
| 2015/0316904 A1 | 11/2015 | Govindaraj et al. | |
| 2016/0132595 A1 | 3/2016 | Bliss et al. | |
| 2016/0112283 A1* | 4/2016 | Maturana | G05B 15/02 709/224 |
| 2016/0179599 A1 | 6/2016 | Deshpande et al. | |
| 2016/0274553 A1 | 9/2016 | Strohmenger et al. | |
| 2016/0274558 A1 | 9/2016 | Strohmenger et al. | |
| 2016/0299999 A1 | 10/2016 | James et al. | |
| 2016/0330291 A1* | 11/2016 | Asenjo | G06Q 30/0201 |
| 2017/0102694 A1 | 4/2017 | Enver et al. | |
| 2017/0126843 A1 | 5/2017 | Pantea et al. | |
| 2017/0192414 A1 | 7/2017 | Mukkamala et al. | |
| 2017/0208151 A1 | 7/2017 | Gil et al. | |
| 2017/0236067 A1 | 8/2017 | Tjiong | |
| 2017/0337226 A1 | 11/2017 | Bliss et al. | |
| 2017/0351226 A1 | 12/2017 | Bliss et al. | |
| 2017/0351241 A1 | 12/2017 | Bowers et al. | |
| 2018/0054376 A1 | 2/2018 | Hershey et al. | |
| 2018/0188704 A1 | 7/2018 | Cella et al. | |
| 2018/0210436 A1 | 7/2018 | Burd et al. | |
| 2018/0285234 A1 | 10/2018 | Degaonkar et al. | |
| 2018/0357823 A1 | 12/2018 | Koniki et al. | |
| 2019/0014180 A1* | 1/2019 | Lawson | H04L 43/045 |
| 2019/0041845 A1 | 2/2019 | Cella et al. | |
| 2019/0062062 A1 | 2/2019 | King et al. | |
| 2019/0078950 A1 | 3/2019 | Huang et al. | |
| 2019/0087900 A1 | 3/2019 | Crowley et al. | |
| 2019/0121340 A1* | 4/2019 | Cella | G05B 23/0229 |
| 2019/0393813 A1 | 12/2019 | Huang et al. | |

FOREIGN PATENT DOCUMENTS

| | | |
|---|---|---|
| EP | 2 592 812 A1 | 5/2013 |
| EP | 2 595 112 A1 | 5/2013 |
| EP | 2 801 935 A1 | 11/2014 |
| EP | 3 018 596 A1 | 5/2016 |
| EP | 3 070 547 A2 | 9/2016 |
| EP | 3 255 590 A1 | 12/2017 |
| EP | 3 410 245 A1 | 12/2018 |
| EP | 3 726 320 A1 | 10/2020 |
| WO | 31/69329 A2 | 9/2001 |
| WO | 2018/144897 A1 | 9/2018 |

OTHER PUBLICATIONS

Second Office Action received for Chinese Patent Application Serial No. 201710432617.4 dated Jan. 15, 2020, 24 pages (Including English Translation).

Non-Final Office Action received for U.S. Appl. No. 15/936,835 dated Apr. 9, 2020, 79 pages.

Non-Final Office Action received for U.S. Appl. No. 15/936,940 dated Apr. 16, 2020, 40 pages.

Notification of Grant of Patent for Invention received for Chinese Patent Application Serial No. 201710432617 dated Jul. 28, 2020, 08 pages.

Non-Final Office Action received for U.S. Appl. No. 16/677,088 dated Aug. 6, 2020, 50 pages.

Final Office Action received for U.S. Appl. No. 15/936,940 dated Aug. 21, 2020, 48 pages.

Communication pursuant to Rule 69 EPC received for EP Patent Application Serial No. 20157116.3 dated Aug. 24, 2020, 2 pages.

European Search Report received for EP Patent Application Serial No. 20157116.3 dated Jul. 15, 2020, 8 pages.

Notice of Allowance received for U.S. Appl. No. 15/609,301 dated Nov. 21, 2019, 43 pages.

Summons to attend oral proceedings pursuant to Rule 115(1) EPC received for EP Patent Application Serial No. 17175165.4 dated Nov. 21, 2019, 32 pages.

Wikipedia, "Modularity", URL: https://en.wikipedia.org/w/index.php?title=Modularity&oldid=714646548, Apr. 11, 2016, pp. 1-10.

Wikipedia, "Modular design", URL: https://en.wikipedia.org/w/index.php?title=Modular_design&oldid=721647382, May 23, 2016, pp. 1-4.

Wikipedia, "Modular programming", URL: https://en.wikipedia.org/w/index.php?title=Modular_programming&oldid=723013178, May 31, 2016, pp. 1-5.

Final Office Action received for U.S. Appl. No. 15/936,940 dated Jan. 14, 2020, 43 pages.

Non-Final Office Action received for U.S. Appl. No. 15/609,301 dated Sep. 3, 2019, 35 pages.

Notice of Allowance received for U.S. Appl. No. 15/609,323 dated Aug. 12, 2019, 37 pages.

Non-Final Office Action received for U.S. Appl. No. 15/936,870 dated Jul. 10, 2019, 51 pages.

Non-Final Office Action received for U.S. Appl. No. 15/936,940 dated Sep. 9, 2019, 65 pages.

First Office Action received for Chinese Patent Application Serial No. 201710432617.4 dated Jun. 20, 2019, 19 pages (Including English Translation).

First Office Action received for Chinese Patent Application Serial No. 201710433517.3 dated Jun. 21, 2019, 19 pages (Including English Translation).

Second Office Action received for Chinese Patent Application Serial No. 201710433517.3 dated Feb. 3, 2020, 23 pages (Including English Translation).

Final Office Action received for U.S. Appl. No. 15/609,301 dated May 22, 2019, 35 pages.

(56) References Cited

OTHER PUBLICATIONS

Final Office Action received for U.S. Appl. No. 15/609,323 dated May 23, 2019, 32 pages.
European Search Report received for EP Application No. 17175165.4 dated Aug. 10, 2017, 9 pages.
European Search Report received for EP Application No. 17175166.2 dated Aug. 14, 2017, 9 pages.
Feddersen, Charles, "Real-Time Event Processing with Microsoft Azure Stream Analytics", Reference Architecture, Jan. 2015, 31 pages.
Non-Final Office Action received for U.S. Appl. No. 15/609,301 dated Dec. 13, 2018, 35 pages.
Non-Final Office Action received for U.S. Appl. No. 15/609,323 dated Dec. 31, 2018, 34 pages.
Communication pursuant to Article 94(3) received for EP Application No. 17175165.4 dated Jan. 18, 2019, 8 pages.
Communication pursuant to Article 94(3) received for EP Application No. 17175166.2 dated Dec. 20, 2018, 10 pages.
Non-Final Office Action received for U.S. Appl. No. 15/489,091 dated Feb. 25, 2019, 26 pages.
European Search Report received for EP Patent Application Serial No. 20169524.4 dated Aug. 19, 2020, 9 pages.
Communication pursuant to Rule 69 EPC for EP Patent Application Serial No. 20169524.4 dated Oct. 26, 2020, 2 pages.
Final Office Action received for U.S. Appl. No. 16/677,088 dated Nov. 20, 2020, 38 pages.
Non-Final Office Action received for U.S. Appl. No. 16/677,088 dated Mar. 1, 2021, 36 pages.
Non-Final Office Action received for U.S. Appl. No. 16/030,257 dated Feb. 11, 2021, 148 pages.
Popovics et al., "Automatic simulation model generation based on PLC codes and MES stored data," 2012, 45th CIRPConference on Manufacturing Systems 2012, 6 pages (Year: 2012).
Schroeder et al., "Visualizing the digital twin using web services and augmented reality," 2016, 2016 IEEE 14th International Conference on Industrial Informatics, pp. 522-527 (Year: 2016).
MMLITE., "MagneMover LITE User Manual", 382 pages.
Extended European Search Report received for European Patent Application Serial No. 20166639.3 dated Mar. 2, 2021, 9 pages.
Extended European Search Report received for European Patent Application Serial No. 20166935.5 dated Feb. 22, 2021, 7 pages.
Extended European Search Report received for European Patent Application Serial No. 20166933.0 dated Mar. 1, 2021, 7 pages.
Communication pursuant to Rule 69 EPC received for European Patent Application Serial No. 20166639.3 dated Apr. 7, 2021, 2 pages.
Communication pursuant to Rule 69 EPC received for European Patent Application Serial No. 20166933.0 dated Apr. 7, 2021, 2 pages.
Communication pursuant to Rule 69 EPC received for European Patent Application Serial No. 20166935.5 dated Apr. 7, 2021, 2 pages.
Non-Final Office Action received for U.S. Appl. No. 15/936,940 dated Mar. 23, 2021, 48 pages.
Notice of Allowance received for U.S. Appl. No. 16/030,257 dated May 27, 2021, 36 pages.
Final Office Action received for U.S. Appl. No. 16/677,088 dated Jun. 9, 2021, 55 pages.
Non-Final Office Action received for U.S. Appl. No. 16/588,118 dated Jun. 28, 2021, 88 pages.
Zhang et al., "A big data analytics architecture for cleaner manufacturing and maintenance processes of complex products". Elsevier Journal of Cleaner Production (2017) pp. 625-641. 16 Pages.

* cited by examiner

| | | | New AI Properties | |
|---|---|---|---|---|
| <TAG 1> | STATE | VALUE | METADATA | AI FIELDS |
| <TAG 2> | STATE | VALUE | METADATA | AI FIELDS |
| <TAG 3> | RATE | VALUE | METADATA | AI FIELDS |
| <TAG 4> | EVENT | VALUE | METADATA | AI FIELDS |
| <TAG 5> | ODOMETER | VALUE | METADATA | AI FIELDS |

SMART GATEWAY PLATFORM FOR INDUSTRIAL INTERNET OF THINGS

BACKGROUND

The subject matter disclosed herein relates generally to industrial automation systems, and, for example, to application of analytics to extract business value from industrial data.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a smart gateway platform is provided, comprising a memory that stores executable components and model templates associated with respective industrial business objectives; a processor, operatively coupled to the memory, that executes the executable components, the executable components comprising: user interface component configured to receive selection data selecting a model template, of the model templates, associated with a business objective of the business objectives, wherein the model template defines data inputs and relationships between the data inputs relevant to the business objective, and wherein the user interface component is further configured to receive mapping data that defines data mappings between the data inputs and data tags of industrial devices; a model configuration component configured to customize the model template in accordance with the mapping data to yield a customized model; a device interface component configured to collect data values from the data tags defined by the customized model; a data modeling component configured to normalize the data values and add modeling metadata to the data values based on the relationships between the data inputs defined by the model template to yield structured data; and an analytics interface component configured to send the structured data to an artificial intelligence analytics system.

Also, one or more embodiments provide a method, comprising receiving, by a smart gateway platform comprising a processor, selection data that identifies a model template from a set of stored model templates associated with respective business objectives, wherein the model template defines data inputs and relationships between the data inputs relevant to a business objective associated with the model template; receiving, by the smart gateway platform, mapping data that defines data mappings between the data inputs and data tags of industrial devices; customizing, by the smart gateway platform, the model template based on the mapping data to yield a customized model; collecting, by the smart gateway platform, data items from the data tags defined by the customized model; normalizing, by the smart gateway platform, the data items; adding, by the smart gateway platform, modeling metadata to the data items based on the relationships between the data inputs defined by the model template to yield structured data; and sending, by the smart gateway platform, the structured data to an artificial intelligence analytics system.

Also, according to one or more embodiments, a non-transitory computer-readable medium is provided having stored thereon instructions that, in response to execution, cause a system to perform operations, the operations comprising receiving selection input that specifies a model template from a set of stored model templates, wherein the set of stored model templates are associated with respective industrial business objectives, and the model template defines data inputs and relationships between the data inputs relevant to a business objective associated with the model template; receiving mapping input that defines data mappings between the data inputs and data tags of industrial devices; customizing the model template based on the mapping input to yield a customized model; collecting data values from the data tags defined by the customized model; normalizing the data items; appending modeling metadata to the data values based on the relationships between the data inputs defined by the model template to yield structured data; and sending the structured data to an artificial intelligence analytics system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is an example data schema depicting items of smart data that have been augmented by a data modeling component to include AI fields defining various AI properties.

DETAILED DESCRIPTION

Figure 1:
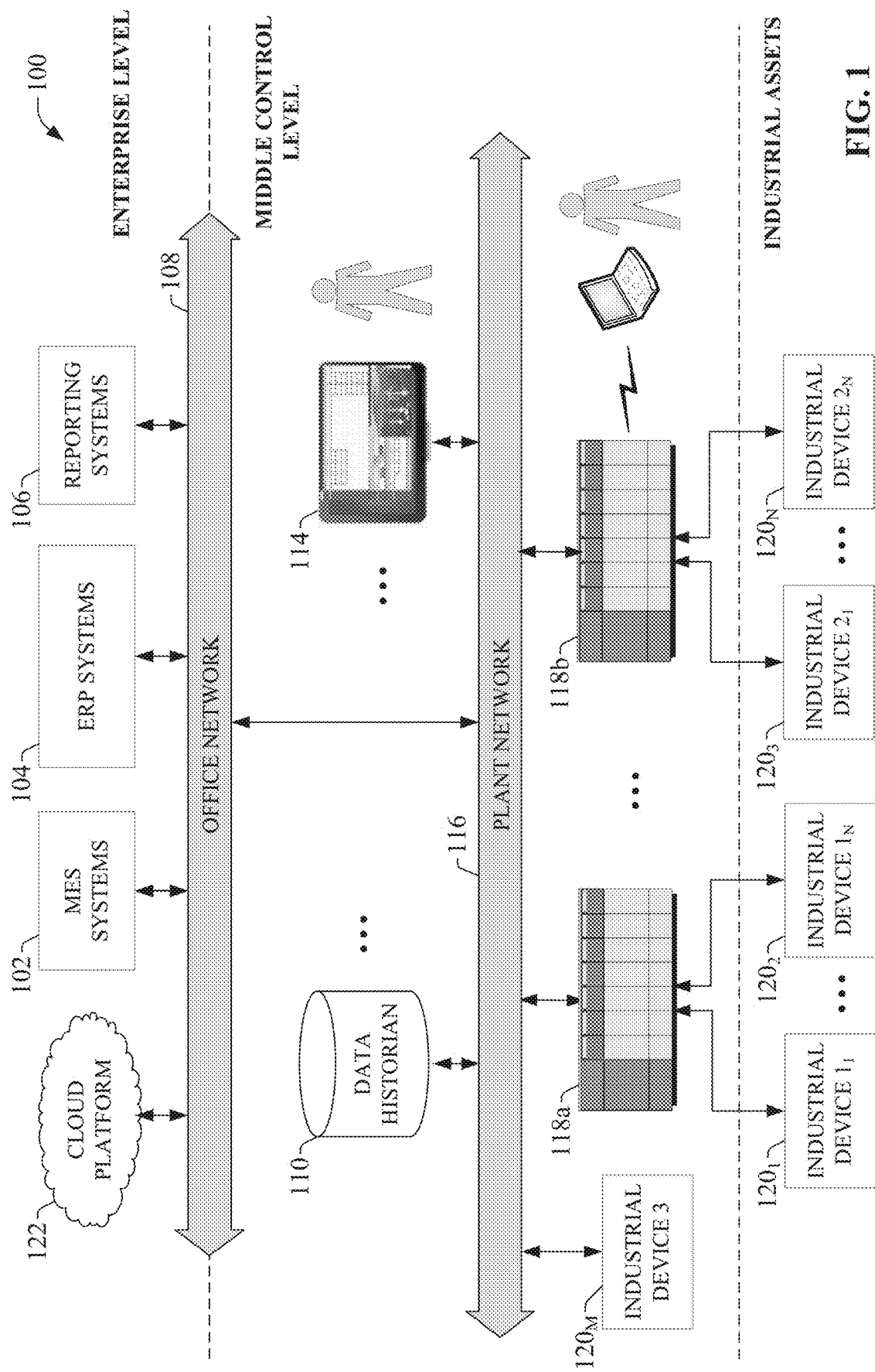
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

A given industrial enterprise can comprise many of these industrial assets, which generate large amounts of information during plant operation. With the advent of big data storage and analytic approaches, it becomes possible to continually stream data from these disparate industrial data sources to big data storage (e.g., a data lake) and transform these large and disparate sets of data into actionable insights into controlled industrial processes and machines. Artificial intelligence (AI) and machine learning hold great promise for extracting insights from industrial big data. These analytic approaches can discover patterns in data that can be leveraged to predict machine failures and identify other useful correlations between industrial data. As a plant's equipment ages, discovery of new correlations between data can provide valuable new insights. For example, AI analytics applied to industrial big data can discover that wear of a pump's bearing is likely to change the vibration of the pump.

The insights gleaned from such big data analysis can lead to increased productivity, optimized production, and new business value.

Figure 2:
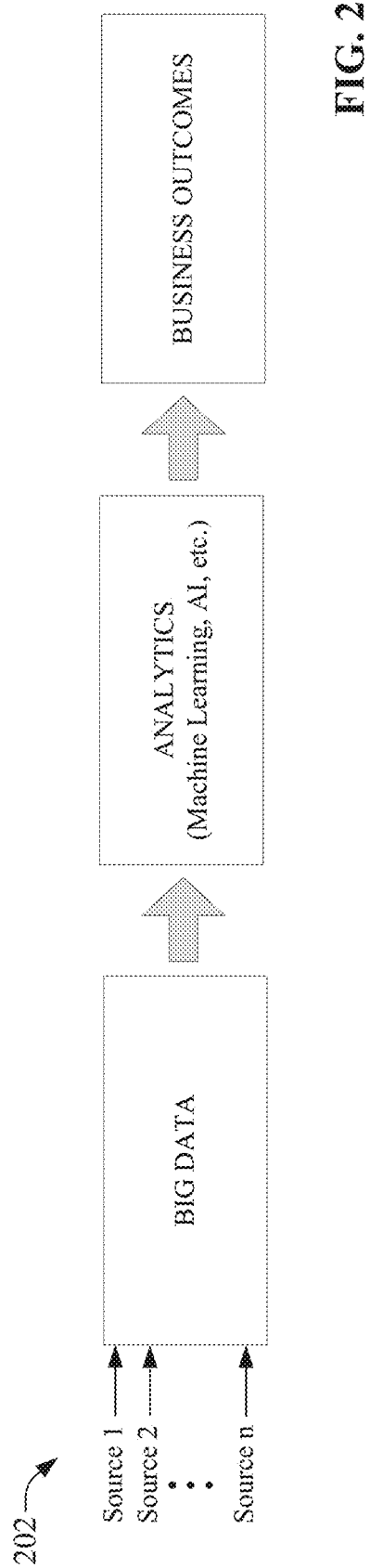
FIG. 2 is a flow diagram illustrating a typical big data analysis approach.

FIG. 2 is a flow diagram illustrating a typical big data analysis approach. According to this approach, data from multiple industrial data sources 202 is streamed to big data storage (e.g., a data lake or database). High-level analytics—such as AI, machine learning, statistical analysis, or another data science approach—are applied to these large and disparate sets of data until useful correlations and actionable insights are discovered. These actionable insights may be in the form of business outcomes, recommendations for minimizing or predicting machine downtime events, recommendations for minimizing energy utilization, recommendations for maximizing product throughput, or other such business goals. Big data analytics can yield insights into these desired business outcomes by discovering correlations between machines, devices, plant-floor events, sensor inputs, and other measurable factors represented by the aggregated sets of big data.

Although data streams from industrial data sources can be used to amass very large sets of data to which analytics (e.g., AI, machine learning, data science, etc.) can be applied, the time to derive value from these large data sets, and the costs associated with storing and processing industrial big data, can be significant. This is because the data generated by industrial devices and other industrial data sources is typically unstructured and initially uncorrelated. Consequently, intelligent analytics must spend a considerable amount of processing time learning correlations and causalities between these sets of unstructured industrial data. This approach also requires considerable data storage capacity given the large amounts of data generated by the industrial enterprise. For example, an oil and gas company is likely to generate large amounts of data from compressors alone, which can produce 500 gigabytes of data per day in some cases, yielding data volumes in excess of a petabyte in one year. Thus, although the approach illustrated in FIG. 2 can lead to discovery of new insights from learned correlations between large data sets, this approach can also produce relatively few insights relative to the large amount of data being stored and processed.

Also, although the analytic approach illustrated in FIG. 2 can identify valid and useful correlations between data sets, big data analytic systems may also identify spurious, misleading, or unhelpful correlations between data sets. Humans are therefore ultimately required to determine whether a correlation learned by the analytic system is valid, and why this relationship exists. Applying this human expertise to analytic results at the back end of the analytic process, by submitting results produced by the AI analytics to an industry expert for review or verification, can result in a considerable amount of analytic processing and data storage wasted on producing spurious results.

To address these and other issues, one or more embodiments described herein provide a smart gateway platform that leverages industrial expertise to identify limited subsets of available industrial data deemed relevant to a desired business objective. This approach can reduce the data space to which AI analytics are applied, and provides useful constraints on the AI analytics, in the form of pre-defined correlations and causalities between the data, that assist data analytic systems to more quickly derive valuable insights and business outcomes. In some embodiments, the smart gateway platform can operate within the context of a multi-level industrial analytic system, feeding pre-modeled data to one or more analytic systems (e.g., AI, machine learning, or statistical analysis systems) executing on one or more different levels of an industrial enterprise.

Figure 3:
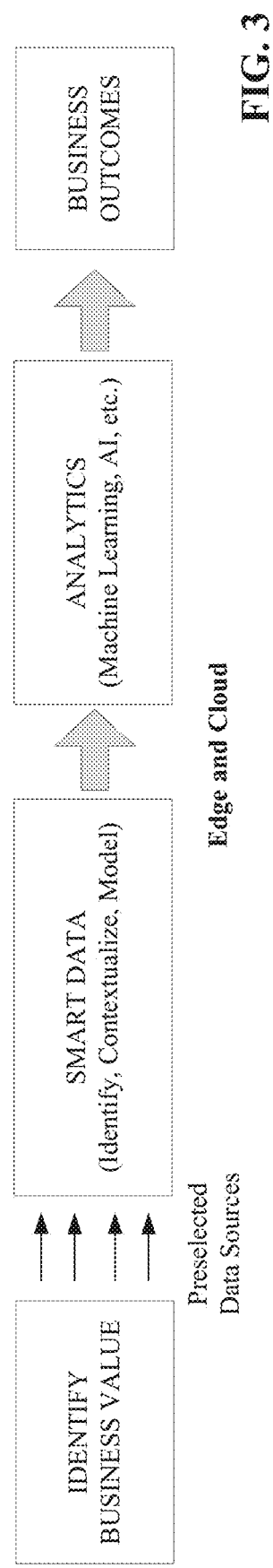
FIG. 3 is a flow diagram illustrating an analytic approach in which a business value is initially identified and data is selected for streaming based on the business value.

Industrial processes such as pumping, packaging, sorting, filling, distillation, and brewing follow patterns of behavior that are, to a degree, predictable and understood by system designers and operators. People who have knowledge of specific sets of industrial machines and processes are known as domain experts. One or more embodiments of the industrial analytic system described herein leverage this domain expertise to aggregate and model selected sets of industrial data as a function of the business output desired from the analytics, then feed this modeled industrial data to higher-level analytic systems for storage and AI analysis. FIG. 3 is a flow diagram illustrating this general analytic approach. Rather than collecting, storing, and analyzing all raw data available from an industrial enterprise (or unnecessarily large sets of this available data), as in the approach depicted in FIG. 2, this approach begins with identification of the business value or outcome desired—e.g., minimize downtime of a certain type of industrial machine, maximize product output, optimize energy efficiency, improve product quality, reduce emissions, etc.—and leverages domain experts' knowledge of causality in industrial systems to select data sets relevant to the desired business outcome, and to contextualize and model the data in a manner that drives the desired business outcome. The system then matches and applies appropriate analytics and data processing solutions to the modeled data. This approach can dramatically reduce the time-to-value of industrial data analytics relative to sifting through large sets of uncorrelated and unstructured industrial data (as in conventional big data analytics approaches). Since the encoded domain expertise specifies the subset of available plant data known to be relevant to the desired business objective, the system can reference this expertise to select and stream only the data items known to be relevant to the problem or business objective to be solved, reducing the amount of data storage required for industrial data analysis.

According to the approach depicted in FIG. 3, the starting point for application of industrial machine learning and AI is identification of the business problem to be solved. Relevant smart data or raw data from one or more industrial data sources is then selected to match desired business outcomes based on defined domain expertise, and the smart data is contextualized and modeled. In some embodiments, the data may be modeled according to object-oriented models. In the case of scalable analytic environments, analytics can be applied to the contextualized and modeled smart data at the level of the industrial enterprise to which the business outcome is most relevant. For example, analysis and actions that relate to real-time operation of industrial machines can be implemented on an edge device and acted upon at the machine level, without the involvement of a higher-level system to determine the necessary control actions.

Figure 4:
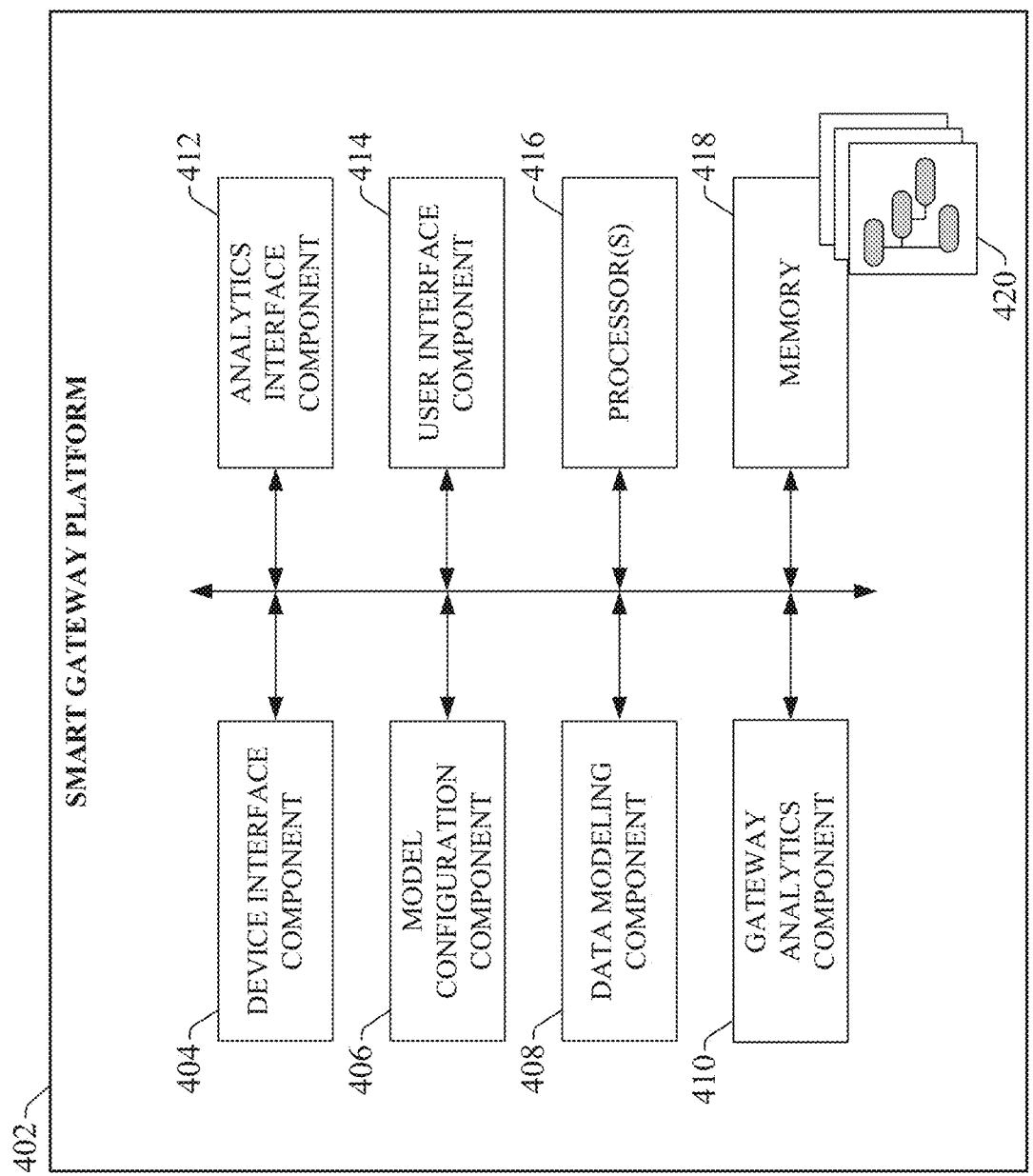
FIG. 4 is a block diagram of an example smart gateway platform.

FIG. 4 is a block diagram of an example smart gateway platform 402 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Smart gateway platform 402 can include a device interface component 404, a model configuration component 406, a data modeling component 408, a gateway analytics component 410, an analytics interface component 412, a user interface component 414, one or more processors 416, and memory 418. In various embodiments, one or more of the device interface component 404, model configuration component 406, data modeling component 408, gateway analytics component 410, analytics interface component 412, user interface component 414, the one or more processors 416, and memory 418 can be electrically and/or communicatively coupled to one another to perform one or more of the functions of the smart gateway platform 402. In some embodiments, components 404, 406, 408, 410, 412, and 414 can comprise software instructions stored on memory 418 and executed by processor(s) 416. Smart gateway platform 402 may also interact with other hardware and/or software components not depicted in FIG. 4. For example, processor(s) 416 may interact with one or more external user interface devices, such as a keyboard, a mouse, a display monitor, a touchscreen, or other such interface devices.

Device interface component 404 can be configured to exchange information between the smart gateway platform 402 and sources of industrial data at one or more plant facilities. Sources of industrial data that can be accessed by the device interface component 404 can include, but are not limited to, industrial controllers, telemetry devices, motor drives, quality check systems (e.g., vision systems or other quality verification systems), industrial safety systems, cameras or other types of optical sensors, data collection devices (e.g., industrial data historians), or other such information sources. These industrial data sources can comprise devices of different types and vendors, and include sources of both structured and unstructured data. In some embodiments, device interface component 404 can exchange data with these industrial devices via the plant networks on which the devices reside. Device interface component 404 can also receive at least some of the industrial data via a public network such as the Internet in some embodiments. The device interface component 404 can directly access the data generated by these industrial devices and systems via the one or more public and/or private networks in some embodiments. Alternatively, device interface component 404 can access the data on these data sources via a proxy or edge device that aggregates the data from multiple industrial devices for migration to the smart gateway platform 402 via the device interface component 404.

Model configuration component 406 can be configured to generate an analytic model that can be leveraged by an AI or machine learning analytic system in connection with applying suitable analytics for achieving a desired business objective. The analytic model can be generated based on a model template—selected from a library of model templates 420 stored on memory 418—that encodes domain expertise relevant to the business objective. The model template can define data items (e.g., sensor inputs, measured process variables, key performance indicators, machine operating modes, environmental factors, etc.) that are relevant to the business objective, as well as correlations between these data items. Model configuration component 406 can transform this model template to a customized model based on user input that maps the generic data items defined by the model template to actual sources of the data discovered by the device interface component 404.

Data modeling component 408 can be configured to model and contextualize industrial data collected by the device interface component 404 based on relationships defined by the analytic model to yield modeled data that can be fed to a local or external AI analytics system. Data modeling component 408 can model both structured and unstructured data from a heterogeneous collection of industrial data sources.

Gateway analytics component 410 can be configured to perform local analytics (e.g., AI, machine learning, statistical analysis, etc.) on the modeled industrial data. Analytics interface component 412 can be configured to interface and exchange data with external systems that consume this data to extract business value (e.g., AI systems, machine learning systems, data lakes etc.). This can include sending the modeled industrial data to these external analytic systems or sending results of local analytics performed by the gateway analytics component 410.

User interface component 414 can be configured to exchange information between the smart gateway platform 402 and a client device having authorization to access the platform. In some embodiments, user interface component 414 can be configured to generate and deliver interface displays to the client device that allow the user to specify a business objective to be solved and to customize or edit a model template associated with the specified business objective to map the model template to industrial data sources. User interface component 414 can also deliver analytic results to the client device, including notifications of predicted asset performance issues, recommendations for achieving the specified business objective, or other such analytic outputs.

The one or more processors 416 can perform one or more of the functions described herein with reference to the systems and/or methods disclosed. Memory 418 can be a computer-readable storage medium storing computer-executable instructions and/or information for performing the functions described herein with reference to the systems and/or methods disclosed.

As noted above, that industrial analytic approach implemented by embodiments of the smart gateway platform 402 leverages industry domain expertise to reduce the data space over which AI analytics are to be applied by explicitly defining the data items known to be relevant to a given business objective (e.g., reduction of machine downtime, reduction of specified machine failures such as paper web breaks, optimization of energy utilization by a specified type of industrial machine, improvement of quality of a particular type of product, etc.). Known correlations and/or causalities between these relevant data items—also drawn from domain expertise—are also predefined and modeled into the data, thereby applying useful analytic constraints that lead to a desired insight more quickly and with less processing overhead relative to applying unconstrained big data analysis over unnecessarily large data sets. This domain expertise is encoded in the form of model templates stored on the smart gateway platform 402.

Figure 5:
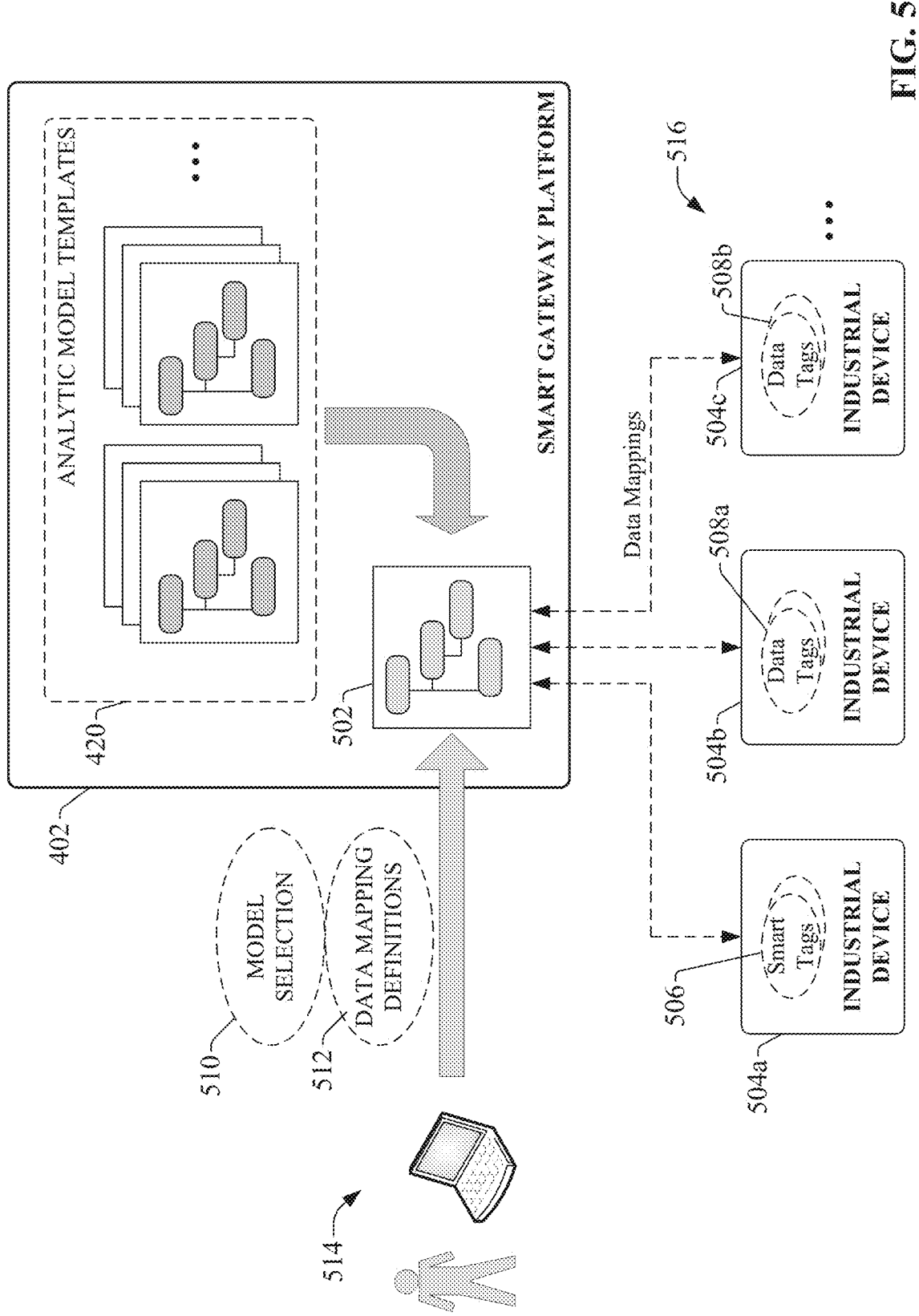
FIG. 5 is a diagram illustrating selection and configuration of a model template designed to model industrial data for subsequent AI analysis.

FIG. 5 is a diagram illustrating selection and configuration of a model template 502 designed to model industrial data for subsequent AI analysis. In one or more embodiments, smart gateway platform 402 can store a library of model templates 420 that are each associated with a corresponding business objective or outcome. Example business objectives can include, but are not limited to, reduction in total machine downtime or number of machine failures; minimization of machine power consumption; optimization of operational efficiency (e.g., amount of machine output relative to an amount of energy consumed by the machine); minimization of emissions; improvement of product quality; identification of factors that yield maximum product output, minimal machine downtime, or maximum product quality; or other such objectives.

Figure 6:
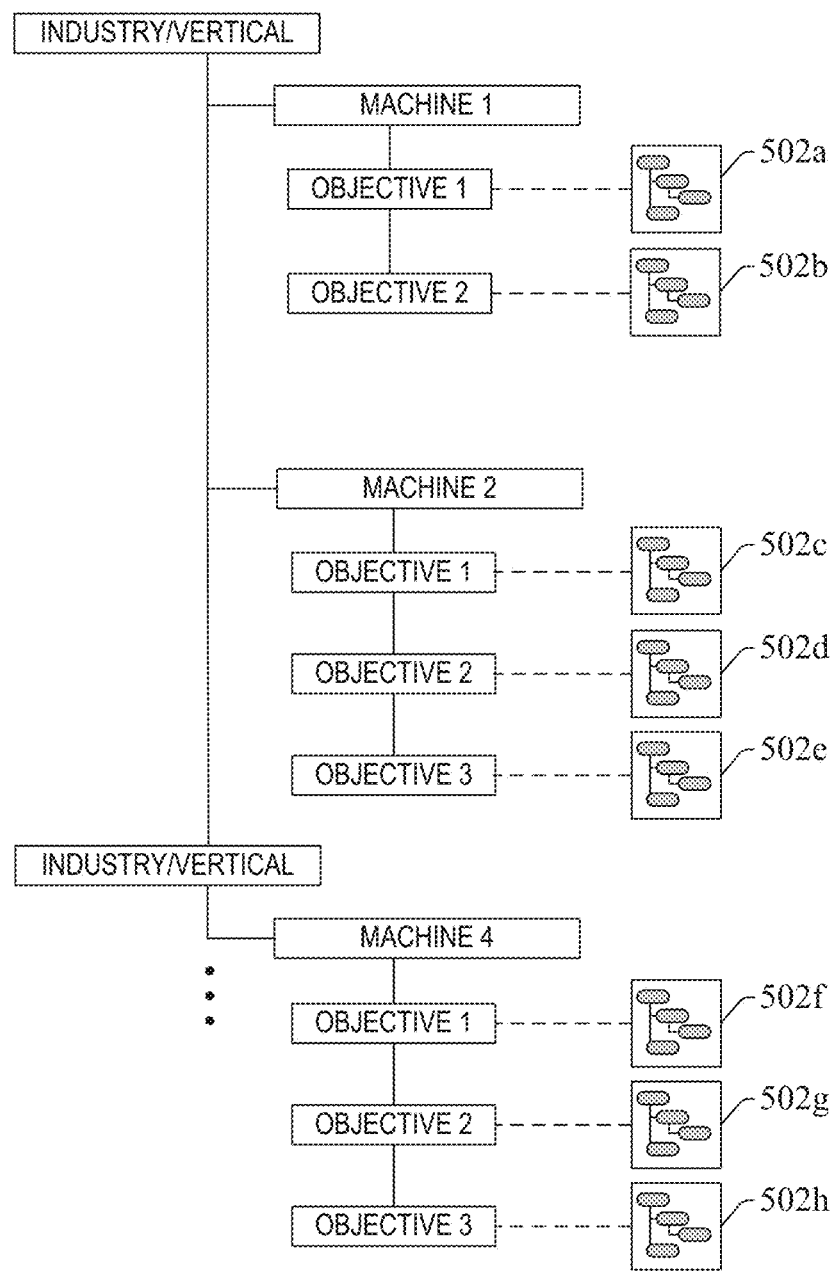
FIG. 6 is a diagram illustrating an example model classification schema for storage of model templates in the smart gateway platform's library.

In some embodiments, these objectives can be grouped according to industry or vertical (e.g., automotive, oil and gas, food and drug, mining, textiles, etc.), machine type, or other such categorizations. FIG. 6 is a diagram illustrating an example model classification schema for storage of model templates 420 in the smart gateway platform's library. User interface component 414 can generate and deliver model template selection screens to a client device that allow the user to navigate the model classification schema in order to select a model template associated with a desired industry-specific and application-specific business objective. According to this example schema, model templates 502 are classified within a hierarchical classification schema according to industry or vertical (e.g., automotive, oil and gas, mining, food and drug, power generation, textiles, etc.). Although only one industry/vertical layer is depicted in FIG. 6, some industries/verticals may include child classifications representing sub-industries classified under the parent industry. For example, selection of an "Automotive" industry classification may prompt the user to select from among several automotive sub-industries, such as Tire and Rubber, Painting, Engine Manufacture, etc.

Under each industry or vertical classification (or sub-industry) is one or more machine selections relevant to that industry or vertical. For example, a Tire and Rubber sub-industry may be associated with several different machines that are typically associated with tire manufacture (e.g., Calendering, Extrusion, Curing Press, Tire Building Machine, Tire Picking Station, etc.). Each machine is associated with one or more predefined business objectives related to the selected machine. Some business objectives may be relatively high level and global objectives, such as minimization of machine downtime or failures, maximization of throughput, minimization of energy consumption, optimization of machine efficiency, etc. Other objectives may be specific or unique to the selected machine and vertical. For example, business objectives associated with a paper cone wrapping machine may include minimization of paper tears or web breaks as the paper is fed from a roller into the machine, or minimization of paper jams as the paper is fed into the machine. In another example, a business objective associated with a washing machine may be to minimize instances of imbalanced spinning.

Selection of a business objective associated with a selected machine invokes the model template 502 associated with that objective. Returning now to FIG. 5, a user selects the desired model template 502 by submitting model selection input 510 (via user interface component 414) that navigates the model template selection hierarchy to the desired business objective. In general, each model template 502 encodes domain expertise applicable to the selected industry- and machine-specific business objective, in terms of which data items are relevant to the problem to be solved and the correlations and causalities between these data items. Each model template 502 specifies which data inputs from the plant-floor industrial devices (e.g., industrial controllers, telemetry devices, sensors, etc.) should be examined by AI analytics in order to learn causes and possible solutions for the problem represented by the selected business objective, and also defines, where appropriate, correlations and causations between these data inputs that are relevant to the business objective.

These definitions of relevant data items and the relationships therebetween are based on collective domain expertise gleaned from industry experts experienced in designing, maintaining, and troubleshooting the selected machine. For a given operational problem relating to a certain machine that carries out a common industrial application, domain experts may have knowledge of which sensory inputs should be examined in order to determine a root cause of non-optimal machine performance, as well as what machine events, modes, or measured operating parameters correlate to certain outcomes. This collective knowledge can be encoded by the model templates 502 and used to apply useful constraints on subsequent AI analysis in connection with evaluating the desired business objective. Some model templates 502 may also specify a type of analytics to run on the specified data items, which is a function of the business problem to be solved.

Model template 502 defines the relevant data items generically since the sources of these data items may vary across different industrial enterprises. For example, a model template 502 associated with the business objective of maximizing product output for a certain machine may specify that conveyor speed is one of the data inputs relevant to evaluating machine performance and learning possible operational modifications that can increase product output. However, the source of this conveyor speed data depends on the equipment in use at the customer facility. This conveyor speed value may be obtainable from a data tag on a motor drive that controls the conveyor motor at one facility, while at another facility the conveyor speed may be measured by a speed sensor and output as an analog signal. Moreover, the conveyor speed may be available in different data formats at different facilities; e.g., as unstructured raw data or as a structured value having associated metadata identifying a source of the speed value.

Upon selection of a generic model template 502 corresponding to the desired business objective, the smart gateway platform 402 allows the user to customize the template 502 by mapping each data item specified by the model template 502 with a source of the data item available from the user's own industrial assets. To this end, user interface component 414 can render interface displays on the user's client device 514 that present the relevant (generic) data items defined by the template 502 and allow the user to, for each data item, browse available data items discovered on the user's industrial assets 516. Sources of data items may be discovered by the gateway platform's device interface component 404, which can browse the plant network and identify smart tags 506, data tags 508, or other sources of industrial data across the industrial devices 504 that make up the user's industrial assets. The user's selections of specific industrial data sources to be mapped to each data item defined by the template 502 can be submitted as data mapping definitions 512, which transform the model template 502 to a customized analytic model.

By leveraging encoded domain expertise, this guided data mapping process can also inform the user if certain items of sensory data relevant to the desired business outcome are not currently being measured in the user's current system implementation. For example, the end user may be unaware that the humidity level within a plant facility increases the risk of web breaks in a paper feed machine. However, this correlation may be known by domain experts and is therefore encoded in the model template 502 associated with the business objective of minimizing web breaks. Thus, when this model template 502 is selected by the user, the smart gateway platform 402 prompts for a source of humidity data during the data mapping process, informing the user of the need for this information and driving installation of a humidity sensor within the plant if such a sensor has not already been installed.

Figure 7:
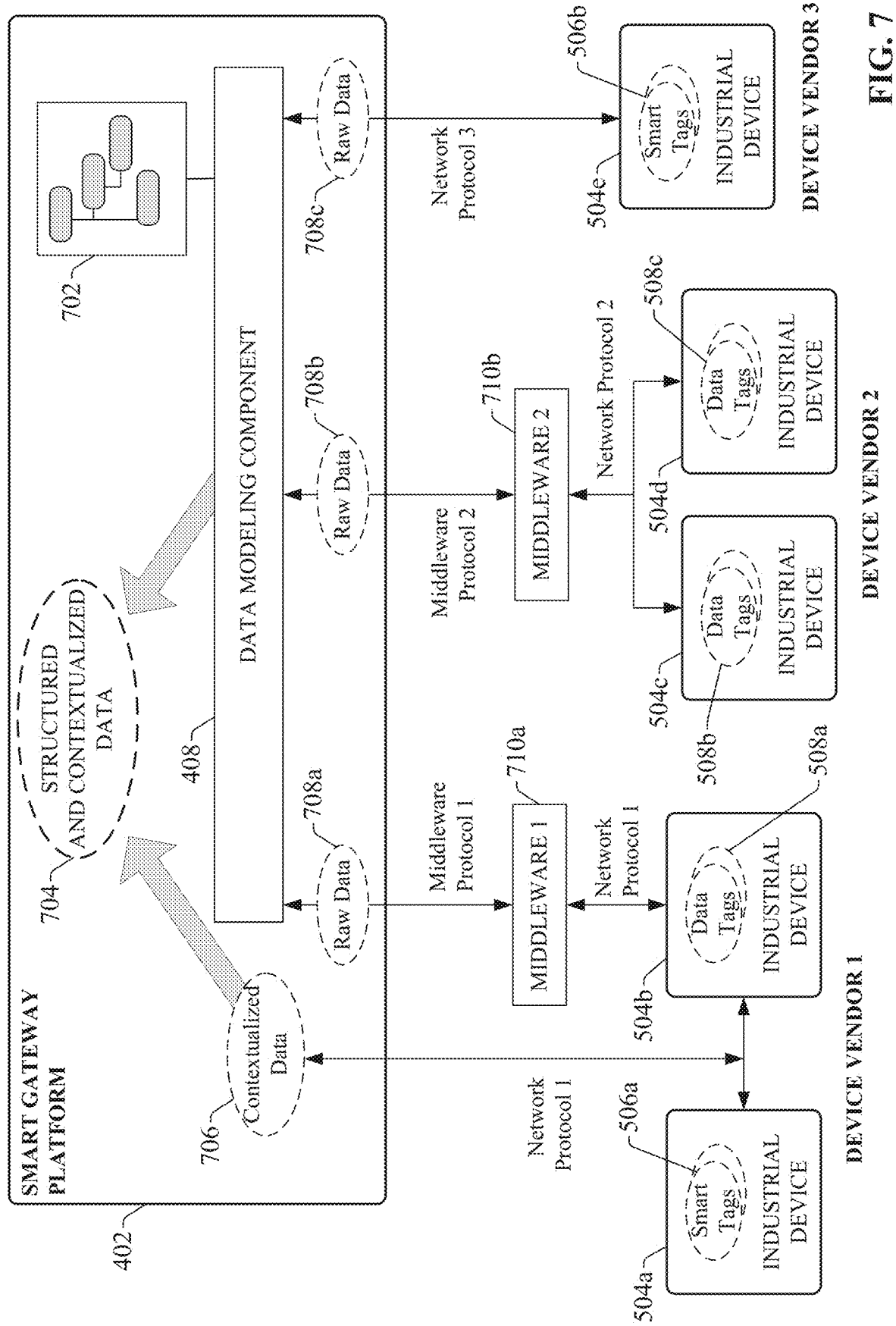
FIG. 7 is a diagram illustrating collection and structuring of industrial data by a smart gateway platform.

Once model template 502 has been customized, smart gateway platform 402 can leverage the resulting customized model to collect and structure the mapped data items for subsequent analysis. FIG. 7 is a diagram illustrating collection and structuring of industrial data by the smart gateway platform 402. In this example, mapping of plant-floor data items to a selected model template 502, as described above, has yielded a customized data model 702 that can be referenced by the smart gateway platform 402 in connection with collecting the specified subsets of available industrial data, as well as pre-modeling the collected data for subsequent AI analytics based on the desired business objective.

The smart gateway platform 402 collects data streams from a disparate collection of industrial devices 504 of different types, vendors, and models. Some of the industrial devices—such as industrial devices 504*a* and 504*e*—may support generation of smart data, or data that has been contextualized with metadata in order to provide additional information regarding the context under which the data values were generated. For example, a motor drive that supports creation of smart data may produce a continuous stream of time-series data conveying a speed of a motor that drives a component of an industrial machine or asset. This motor speed data can yield additional valuable insights if the speed data is combined with the operating state of the device or machine (e.g., Running, Faulted, etc.) at the time the motor speed value was measured. In another example, electrical parameters of a device such as voltage, current, and power factor can be similarly linked to the operating state of the device at the time the parameters were measured to yield contextualized data. Some industrial devices 504 can support creation of such contextualized smart data and storage of this contextualized data in smart tags 506. This smart data 706 can be obtained from smart tags 506 (if supported by the industrial device 504) by the smart gateway platform 402 if the model 702 dictates that this data is relevant to the business objective to be evaluated.

Figure 8:
FIG. 8 is an illustration of four example smart data types that can be supported by some industrial device.

Some industrial devices 504 can create contextualized data using special instructions and custom smart tag data structures to perform computations and create names and structure for the contextualized data. FIG. 8 is an illustration of four example smart data types that can be supported by some industrial devices 504. These data types can supplement other standard data types that are typically supported by industrial controllers or other industrial devices (e.g., integer, real, Boolean, string, floating point etc.). In general, data tags (both standard data tags and smart tags) are data structures defined within an industrial device that reference a memory location within the device (e.g., an input value, an output value, or an internal data register) and correspond to respective data items. A data tag can be configured to be of a specified data type, such as Boolean, floating point, integer, double integer, string, etc. During development, controller tags can be created and maintained in a tag database of the industrial device 504. The smart tags described herein are additional data types that are catered to industrial automation applications, and that supplement conventional data types.

In the illustrated example, the smart data types comprise four structured information data types—a State data tag 802, a Rate data tag 804, an Odometer data tag 806, and an Event data tag 808. Although the examples described herein assume that the supported smart tags comprise these four data types, it is to be appreciated that some embodiments may include other smart data types without departing from the scope of this disclosure.

Each smart tag includes a field for storing the current value of the smart tag (e.g., a state value, a rate value, an odometer value, and an event value) as well as one or more metadata fields configured to store user-defined configuration data for that smart tag. The metadata values for each smart tag can customize analytics, management, and presentation of the associated smart data value in accordance with the particular industrial asset or industrial application with which the smart tag is associated.

The value contained in a State data tag 802 can represent a current state of an industrial asset or device (e.g., a machine, a production line, a motor drive, etc.). The state data contained in a State data tag 802 can represent one of a set of predefined states representative of a current state or status of the associated industrial asset or device. For example, the State data tag may convey an S88 state (that is, states defined as part of the ANSI/ISA-88 batch process standard), a Packaging Machine Language state, a current state of a state machine defined for the asset, a state of a valve (e.g., OPEN or CLOSED), a state of a motor (e.g., RUNNING, IDLE, FAULTED, etc.), or other types of states.

User-configurable metadata associated with the State data tag 802 may define a state machine representing available states of the associated asset, where each defined state is configured to be invoked in response to a detected condition. For example, each defined state may be linked via the metadata to one or more other related data tags defined in the industrial device 504 (e.g., a data tag representing a state of a sensor or switch indicative of the defined state), such that the current state indicated by the State data tag 802 is a function of the current values of the related data tags.

The value contained in a Rate data tag 804 can represent an integer or real value of a measured rate of a metric associated with the industrial asset or device. The rate value can be an instantaneous rate or a value representing a rate of change of the metric over time. For example, the rate value contained in the Rate data tag 804 can represent a temperature, a pressure, a velocity (e.g., a velocity of a conveyor or other motor-driven machine component), an overall equipment effectiveness (OEE), or other such metric.

User-configurable metadata associated with the Rate data tag 804 can define maximum and minimum values for the corresponding rate value, such that the value contained in the Rate data tag 804 will not deviate outside the window defined by the maximum and minimum value metadata. The metadata can also identify one or more data sources (e.g., one or more other data tags or input addresses) that determine the event. For example, the metadata for the Rate smart tag 804 can define whether the corresponding rate value is an aggregation of multiple other values contained in other defined data tags. The rate value can be defined as an average or a sum of two or more identified data tags, or an integral of a data tag over time. Another metadata field can be used to designate an engineering unit to be associated with the rate.

The value contained in the Odometer data tag 806 can represent a cumulative quantity associated with an industrial asset. For example, the Odometer data tag 806 can be configured to represent cumulative quantity with a rollover value, such as a part count associated with the industrial asset. In such cases, the metadata associated with the Odometer data tag 806 can include a definition of the rollover value. The Odometer data tag 806 may also be configured to represent a quantity over a defined time interval, such as an energy consumption associated with the asset. In the case of quantities over a defined time interval, the metadata associated with the Odometer data tag 806 can include a definition of the time interval, which may be defined in terms of daily start and end times, in terms of a start time and a defined duration of the time interval, or as another time definition format. The metadata associated with the Odometer data tag 806 can also define one or more data sources that drive the odometer value. For example, the metadata may define a data tag associated with a Cycle Complete event, such that the odometer value will increment when the Cycle Complete data tag goes high. The odometer value may also be defined to be an aggregation of multiple values. In such cases, the metadata may identify two or more data tags whose values are to be aggregated or summed to yield the odometer value. The metadata can also define a unit of measure associated with the odometer value (e.g., bottles filled, operating cycles, megawatt-hours, etc.).

The value contained in the Event data tag 808 can represent an instantaneous or persistent event associated with an industrial asset. For example, an Event data tag 808 may represent an instantaneous event such as a push-button event (e.g., "Service Button Pushed"), a sensor event (e.g., "Part Present," "Person Detected," etc.), a safety device event (e.g., "Light Curtain Broken"), or another such instantaneous event. Persistent events that can be represented by Event data tag 808 can include, but are not limited to, events associated with an alarm status (e.g., "Alarm Unacknowledged," "Alarm Acknowledged," etc.). Other examples of persistent events that can be represented by an Event data tag 808 can include persistent events with an identifier and a state. For example, events associated with a batch process can include a batch number (an identifier) and an associated event (e.g., "Starting," "Executing," "Complete," etc.). User-configurable metadata associated with the Event BIDT 610 can include identifiers of other data tags whose states, in aggregation, determine the event to be represented by the Event data tag 810. Alternatively, if the event represented by Event data tag 808 is a function of only a single input (e.g., a push-button input), the metadata can identify the appropriate input address of the industrial device.

It is to be appreciated that the smart tags described above in connection with FIG. 8 are intended to be exemplary, and that other types of smart tags are also within the scope of one or more embodiments of this disclosure.

Returning now to FIG. 7, smart gateway platform 402 discovers and collects, on a substantially real-time basis, the data items defined by model 702 based on the previously defined data mappings applied to the selected model template 502. In the illustrated example, some industrial devices 504 (e.g., industrial device 504a) support contextualization of data at the device level, while other industrial devices 504 only generate uncontextualized raw data 708 stored in standard data tags 508. Moreover, data from some industrial devices 504 is directly accessible by the smart gateway platform 402 via the plant network protocol (e.g., Network Protocol 1 or Network Protocol 3), while other third-party or legacy industrial devices 504 may be accessible only via middleware applications 710, which wrap the device data in an industry standard wrapper (e.g. OLE for Process Control (OPC) or another middleware protocol). Streaming this raw data 708 over time creates unstructured big data if the data is not contextualized and modeled close to the data source. Accordingly, the platform's data modeling component 408 is configured to contextualize raw data 708 from disparate data sources by naming, combining, and aggregating the data in accordance with model 702. The resulting transformed raw data can be stored together with any pre-contextualized smart data 706 from industrial devices that support smart data tags 506 to yield structured and contextualized data 704 suitable for collective AI or machine learning analysis.

In general, model 702 specifies the data that should be analyzed to yield insights into the desired business objective, and also informs data modeling component 408 how to organize and combine the specified data items into meaningful clusters that can drive the analytics. These clusters are based on the correlations and causalities between the data items as defined by the model 702. Any raw data 708 that is not already pre-modeled and contextualized at the device level is transformed by the data modeling component 408 into smart data before being fed to AI analytics as structured and contextualized data 704. This creates a common representation of all the disparate data collected by the smart gateway platform 402. In an example scenario, overall equipment effectiveness (OEE) data from machines of a production line may be in different formats, depending on the vendor, model, and/or age of the industrial devices from which the data is collected. Data modeling component 408 can normalize this disparate OEE data into common representations. Data modeling component 408 can also add metadata to the data collected from the machines to yield contextualized smart data. Data modeling component 408 determines what metadata is to be added to a given item of raw data based on data correlations or causalities defined by model 702. For example, if the model 702 specifies that leak test result data from a leak test station that checks a manufactured engine block for porosity issues is partly a function of a die cast oven temperature at the time the engine block was formed, the data modeling component 408 can add this oven temperature value to the leak test result data as metadata.

In some embodiments, the metadata added to the collected smart and raw data by the data modeling component can include AI metadata that guides subsequent AI or machine learning analysis of the data 704. FIG. 9 is an example data schema depicting items of smart data 902 that have been augmented by the data modeling component to include AI fields 904 defining various AI properties. In some scenarios, model 702 may specify one or more key variables or measurements that are relevant to the business objective of interest, as well as the relationships of the key variables to other variables or measurements. These relationships represent key correlations or causalities relevant to the desired business objective, as gleaned from collective industry expertise. Based on these relationships defined in the model 702, data modeling component 408 can augment the relevant smart data by adding AI contextualization metadata. This can involve adding new AI fields to the smart data 902 that represents the key variable as well as to the related smart data 902 determined to have an impact on the key variable. Values of the new AI fields 904 can encode relationships between the key variable and its correlated variables (those variables that directly affect the value of the key variable), as well as other information that can place useful constraints on subsequent AI and machine learning analysis.

For example, a new AI field 904 can be added to the key variable smart data tag that identifies the smart tag as representing a key variable. Additional AI fields 904 can identify the other smart tags that affect the value of the key variable. If model 702 defines a mathematical relationship between the key variable and the other relevant variables (based on domain expertise encoded in the model 702), this mathematical relationship can also be included in one or more of the AI fields 904 (e.g., as a mathematical function defining the relationship between flow output of a pump, power consumed by the pump, and water pressure).

In some embodiments, AI fields 904 can also define the type or class of analytic problem to be solved relative to the key variable (e.g., modeling, clustering, optimization, minimization, etc.). The type of analytic problem can be based on the selected business objective associated with the model 702 (e.g., determine reasons why product quality is falling outside acceptable tolerances, improve product output, minimize energy consumption, etc.). Encapsulating these problem statements in the structure of the smart data 902 can convey to AI analytic systems the nature of data analysis to be carried out on the data 704. Since this analytic problem statement is embedded within the structure of the structured and contextualized data 704, real-time analytics systems that interface with the data 704 can identify the prescribed type of analytics defined by the AI fields 904 and carry out the defined analysis with minimal user intervention regardless of the platform on which the AI analytics system executes (e.g., an edge device, a cloud platform, a server, an embedded platform, etc.). Enhancing the smart data 902 to append AI fields 904 that record relationships between variables of the modeled industrial system makes these relationships visible properties of the smart data 902, which can be accessed and leveraged by analytic systems that process the data 704.

Data modeling component 408 also organizes and aggregates the transformed data to yield structured and contextualized data 704. In some embodiments, data modeling component 408 can model the data to reflect an industrial enterprise hierarchy within which the data sources reside. For example, since many industrial systems are modular and hierarchical, batch processing systems may be represented by a hierarchy comprising layers representing (from highest to lowest) the industrial enterprise, the plant site, the production area within the site, the cell within the production area, the unit within the cell, and the equipment or machine within the unit. Each area in a plant may comprise many machines and associated industrial devices 504. Data from devices that are connected to a given machine can be aggregated at the machine level to produce meaningful contextualized data. This aggregated machine-level data can include, for example, the machine's uptime, throughput, energy consumption, and quality. Further aggregation of machine data at higher levels of the hierarchy can yield cell-level and site-level data. Each level of aggregation can lead to valuable insights into plant operation. These insights become possible due to the organization of the data at different levels of the plant's hierarchy. The smart gateway platform 402 can name, process, and annotate data according to a defined enterprise hierarchy (which may be part of model 702, or may be separately defined and referenced by data modeling component 408), driven by the desired business outcome to be served by the structured and contextualized data 704.

Smart gateway platform 402 can also synchronize the data collected from the industrial devices 504 prior to storage as structured and contextualized data 704. In general, related data items that drive the desired business outcome are collected synchronously and time-stamped to establish relevancy. For example, if the business objective is to optimize the energy consumed by a mixer that mixes cookie dough, smart gateway platform 402 can synchronize the start and stop times of the mixer with the power readings from a power meter to obtain relevant and accurate data for processing. Model 702 may also specify that data items representing the amount of dough, sugar, water, temperature, batch type, and batch sizes are to be correlated with energy. Smart gateway platform 402 can time-synchronize and structure this data accordingly for subsequent data processing and analytics.

In some embodiments, data modeling component 408 can also process raw data 708 to create new OEE data for machines that do not provide such data. For example, if model 702 indicates that machine run time is required for the desired business objective analytics, data modeling component 408 can calculate this run time by subtracting a raw data value representing the time that the machine was not running from another raw data value representing the planned production time. In another example, if model 702 indicates that power consumption is a required factor for the business objective analytics, data modeling component 408 can combine voltage and current data obtained from a motor drive to yield the required power data. The power calculation for all drives (and other device) can be standardized to a common representation, since devices from different vendors may report current and voltage in different units and formats (e.g., volts, kilowatts, etc.).

In some embodiments, smart gateway platform 402 can also be configured to generate alarms and events that are triggered by limits on individual or combined data values. These notification data types can be named in the smart gateway platform 402.

Figure 10:
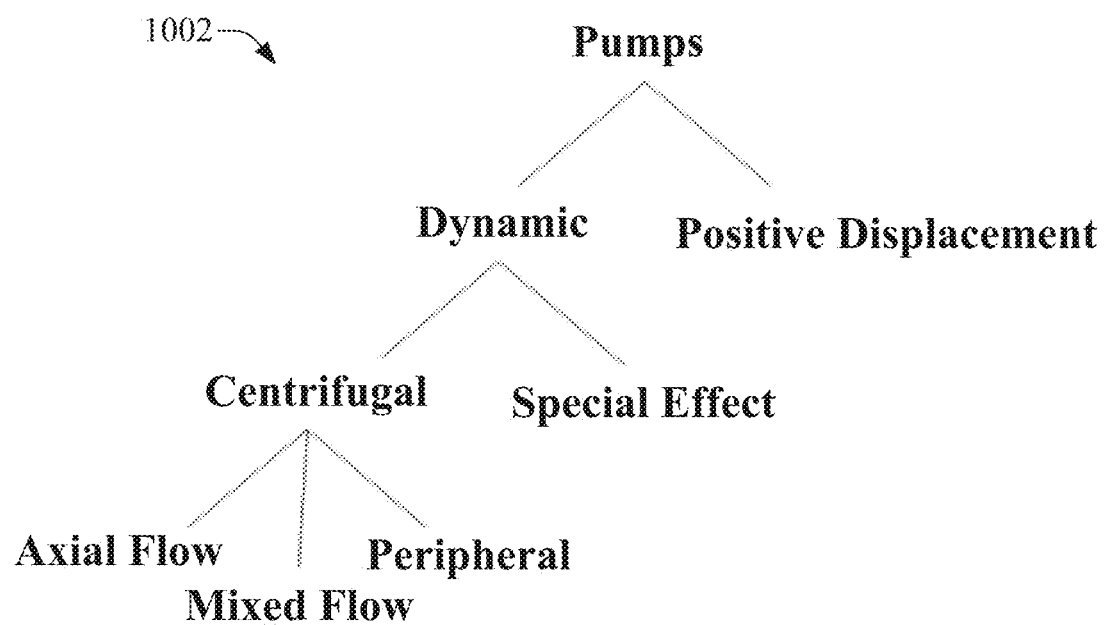
FIG. 10 is an example asset type hierarchy for industrial pumps.

Some embodiments of data modeling component 408 can further model at least some of the raw data and smart data to conform to an object-oriented asset model if appropriate. Industrial plants typically operate many common industrial assets, including pumps, boilers, and compressors. Many such assets are deployed within the plant, and in some cases there may be many types and models of these assets. Some asset types can be described hierarchically. FIG. 10 is an example asset type hierarchy 1002 for industrial pumps. Pumps can be categorized according to two different types of pumps—dynamic and positive displacement. Dynamic pumps can be either centrifugal or special effect. Centrifugal pumps can be axial flow, mixed flow, or peripheral. A common type of centrifugal pump is an electrical submersible pump.

In some embodiments, the smart gateway platform 402 can transform items of data (either raw data or smart data) received from industrial assets to add object-oriented model metadata describing the asset's hierarchical path within the asset hierarchy (e.g. Pumps.Dynamic.Centrifugal.Peripheral). Such hierarchical data models can assist analytic systems to organize the data for analytics, presentation dashboards, or other such data manipulation. For example, if data from various types of pumps is modeled according to the pump type hierarchy depicted in FIG. 10, analytic systems can easily compare the efficiency of two different pump types—e.g., axial flow pumps and mixed flow pumps—by segregating data for these two pump types and comparing the two resulting data sets. Such data modeling can also allow specific pump types to be selected for focused, type-specific data analytics. By utilizing such a hierarchical asset model, data associated with each pump (e.g., pressure, flow rate, liquid volume, energy loss, pump efficiency, etc.) is inherited by all child nodes in the hierarchical path for a given pump (e.g., a flow rate for a given axial flow pump is applied to the pump itself, as well as to the axial flow, centrifugal, dynamic, and pump hierarchical classifications). Connecting contextualized smart data to object-oriented asset models can yield relevant data from industrial controllers and devices that is mapped to assets for rapid transformation into business value by analytic systems.

In conventional big data analytics, data scientists spend a considerable amount of time pre-processing or "cleansing" data in preparation for analytics. Using some or all of the data management techniques described above—driven by initial selection of a desired business objective—the smart gateway platform 402 can eliminate the need for such data cleansing by transforming unstructured industrial data into contextualized and structured smart data that is conducive to AI and machine learning analytics and organized reporting.

Figure 11:
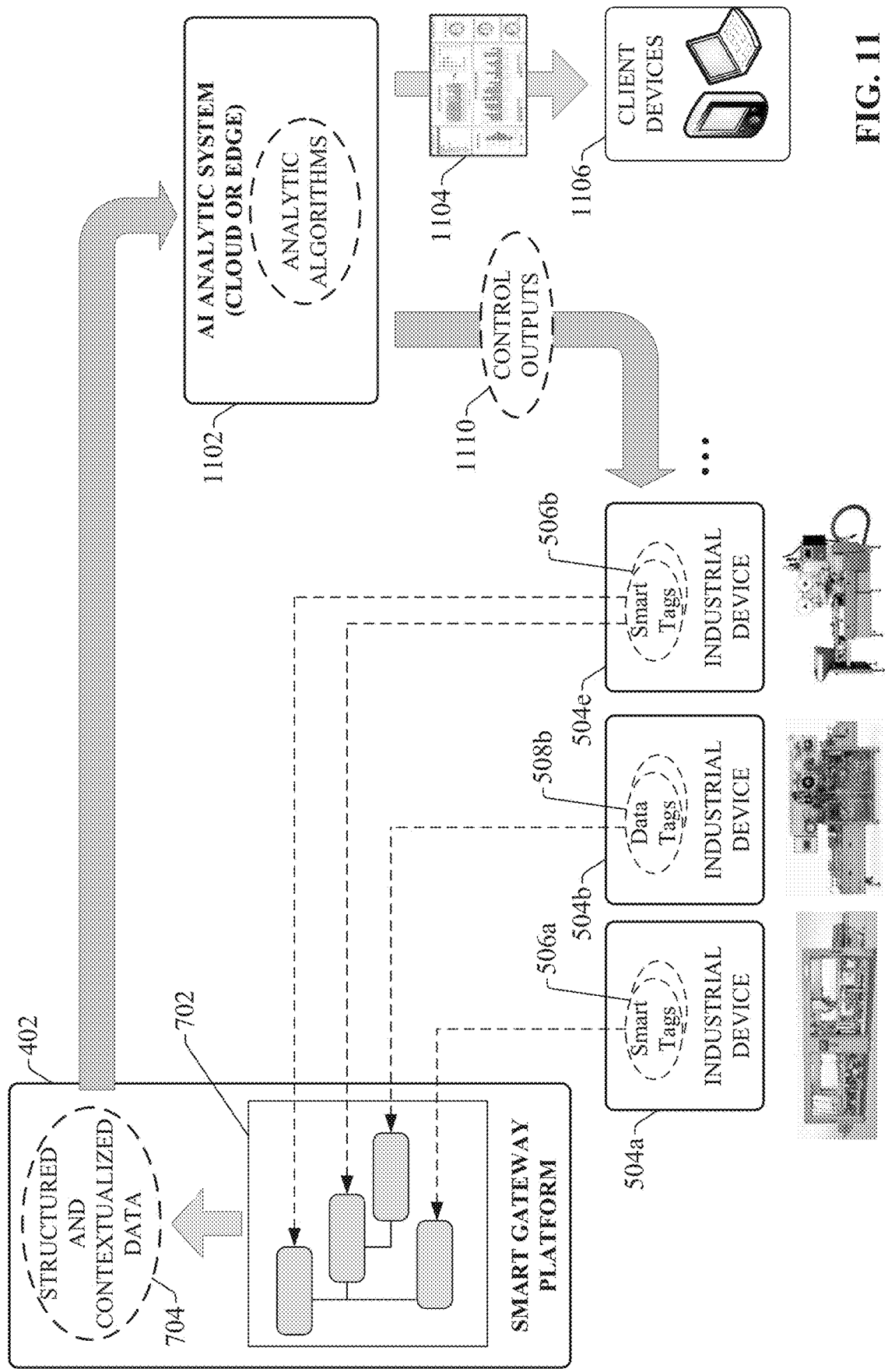
FIG. 11 is a diagram illustrating an example architecture in which a smart gateway platform collects, contextualizes, and structures data from industrial assets and provides the resulting structured and contextualized data to an AI analytic system.

As noted above, the structure and contextualized data 704 generated by the smart gateway platform 402 can be fed to an analytic system, which can perform AI or machine learning analytics on the structured data in order to glean insights and generate recommendations relating to the business objective associated with the model 702. FIG. 11 is a diagram illustrating an example architecture in which the smart gateway platform 402 collects, contextualizes, and structures data from industrial devices 504 and provides the resulting structured and contextualized data 704 to an AI analytic system 1102. Although FIG. 11 (and other examples described herein) depicts data 704 being fed to an AI analytic system 1102, other types of analytics can be applied to the data 704 without departing from the scope of this disclosure, including but not limited to machine learning or statistical analysis systems. After model 702 has been customized by mapping the model's defined data items to specific data items on the industrial devices (e.g., smart tags 506 and/or standard data tags 508), the smart gateway platform 402 begins collecting and transforming the data from the mapped data sources as described above to yield structured and contextualized data 704. Since the collected data is contextualized and structured based on relevant correlations and causalities defined by the model 702—that is, correlations and causalities defined as being relevant to the particular business objective being examined—these correlations and causalities are provided to the AI analytic system 1102 as metadata associated with the collected data items. The platform's analytics interface component 412 can be configured to exchange data with the AI analytic system 1102, and is capable of feeding the data 704 to the analytics system.

Informing AI analytic system 1102 of relevant data correlations and causalities between the data items prior to application of data analytics can apply useful constraints on data analysis performed by the AI analytic system 1102. These constraints can drive the analytic system 1102 to useful insights more quickly relative to unconstrained big data analysis, significantly reducing the amount of time required for the AI analytic system 1102 to discover insights and generate useful recommendations relative to the desired business objective. These predefined correlations and causalities can also mitigate discovery of spurious or irrelevant correlations between the data items by the AI analytic system 1102. By limiting the set of data supplied to the AI analytic system 1102 to only those data items deemed relevant by the model 702, and by structuring and contextualizing these data items based on predefined correlations and causalities derived from collective industry expertise, the smart gateway platform 402 narrows the data space to be analyzed by the analytic system 1102, assisting the analytic system 1102 to discover useful insights and generate recommendations more quickly relative to unconstrained big data analysis. The limited set of collected data items can also simplify data life cycle management.

Subsets of the data items collected by the smart gateway platform 402, as well as results of AI or machine learning analytics applied by analytic system 1102 on the data, can be delivered as visualization presentations 1104 to one or more client devices 1106 having permission to access the analytic results. Information rendered on visualization presentations 1104 can include recommendations or actionable insights about operation of the industrial devices relative to the business objective originally selected by the user. For example, if the originally selected model template 502 (on which model 702 is based) pertains to the business objective of maximizing product output of a certain type of industrial process, smart gateway platform 402 will collect, structure, and contextualize data items known to be relevant to obtaining actionable insights into this problem. This structured and contextualized data 704 is fed to AI analytic system 1102 (e.g., as streaming start data), which performs AI or machine learning analysis on the smart data streams with the goal of determining root causes of productivity loss and generating recommended countermeasures or actionable insights. In this regard, reduction of the relevant data set by the smart gateway platform 402 to those data items known to be relevant to the business objective, as well as the known correlations and causalities between the data items encoded into the smart data based on model 702, can lead the AI analytic system 1102 more quickly to actionable insights regarding the defined business objective. In an example scenario, AI analytic system 1102 may determine, based on application of AI or machine learning to the structured and contextualized data 704, that downtime of a particular production line (e.g., Line 5) that is part of the overall process is a significant cause of productivity loss. Accordingly, AI analytic system 1102 may determine, based on further AI analytics, one or more possible countermeasures for reducing the total accumulated downtime of Line 5 (e.g., reducing an operating speed, increasing a frequency of maintenance performed on Line 5, modifying an operating sequence, etc.). The discovered root cause and associated recommended countermeasures can be presented to the user via visualization presentations 1104. If AI analytic system 1102 is designed to perform predictive analysis or trend analysis, the system 1102 may also identify indications within the data 704 that typically precede a downtime event, and continue monitoring the structured and contextualized data 704 for the presence of these indications. In response to determining that relevant items of data 704 satisfy the criteria indicating an impending downtime event, the analytic system 1102 may generate and deliver a notification to one or more client devices 1106 informing of the predicted downtime event.

In some embodiments, in addition to or as an alternative to rendering recommendations and actionable insights into solving the specified business objective, analytic system 1102 can generate and direct control outputs 1110 to one or more of the industrial devices 504 based on results of analytics applied to the data 704. Control outputs 1110 can be configured to alter a configuration or operation of selected industrial devices 504 in a manner predicted to move operation toward the specified business objective. For example, if analytic system 1102 determines that reducing a speed setpoint of a motor drive will reduce downtime instances of a particular production line, thereby achieving the business objective of improving production output, system 1102 may direct a control output 1110 to the selected motor drive that alters the speed setpoint accordingly. Analytic system 1102 can deliver control outputs 1110 to the target industrial devices via any suitable means, depending on the system architecture. For example, if analytic system 1102 is an edge device that resides on the same plant network as the industrial devices, control outputs 1110 can be delivered directly via the network. In another example architecture, analytic system 1102 may deliver control outputs 1110 to the target industrial devices 504 via the smart gateway platform 402.

Figure 12:
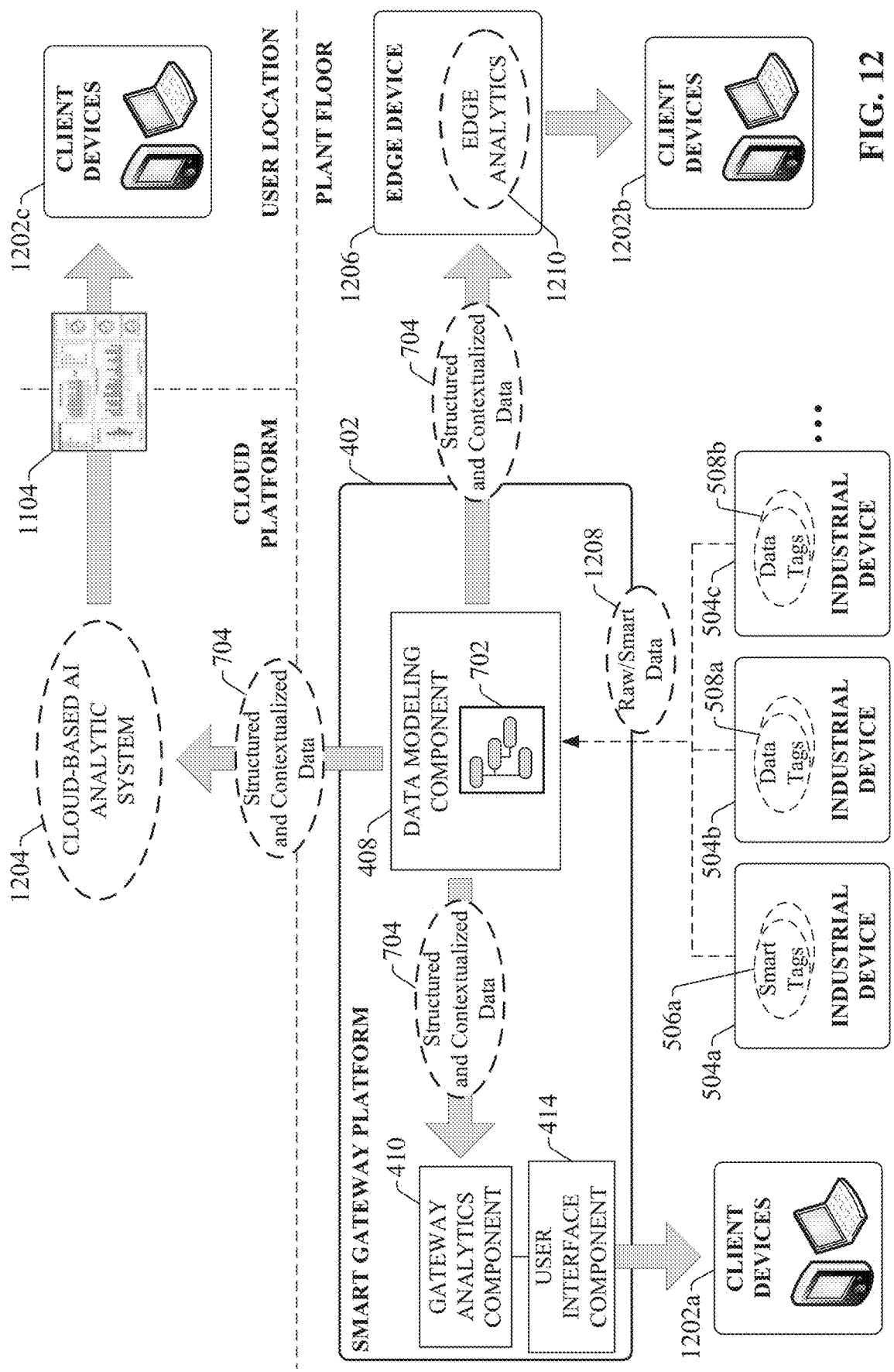
FIG. 12 is a diagram illustrating an example architecture in which a smart gateway platform provides structured and contextualized data to analytic systems at various levels of an industrial enterprise.

The AI analytic system 1102 to which smart gateway platform 402 feeds the structured and contextualized data 704 may execute on the smart gateway platform 402 itself (e.g., as gateway analytics component 410), may execute on a separate edge device on the plant network, or may execute at a higher level of the industrial enterprise or on a cloud platform. FIG. 12 is a diagram illustrating an example architecture in which smart gateway platform 402 provides structured and contextualized data to analytic systems at various levels of an industrial enterprise. As described above, the platform's data modeling component 408 contextualizes, models, and structures raw and/or smart data 1208 collected from industrial devices 504 in accordance with model 702. The platform's analytics interface component 412 passes the resulting structured and contextualized data 704 to an analytics system for AI or machine learning analysis. The industrial environment depicted in FIG. 12 includes AI analytic systems that execute at various levels of the enterprise, including a local gateway analytics component 410 that is integrated with the smart gateway platform 402 itself, an edge-level analytic system 1210 that executes on an edge device 1206 (e.g., a network infrastructure device or other type of device that provides access to the plant network), and a cloud-based AI analytics system 1204 that executes on a cloud platform. Any of these analytic systems can perform analytics on the structured and contextualized data 704 as described above. Each of these analytic systems can provide visualization presentations 1104 containing notifications, recommendations, or actionable insights to authorized client devices 1202 as also described above.

Figure 13:
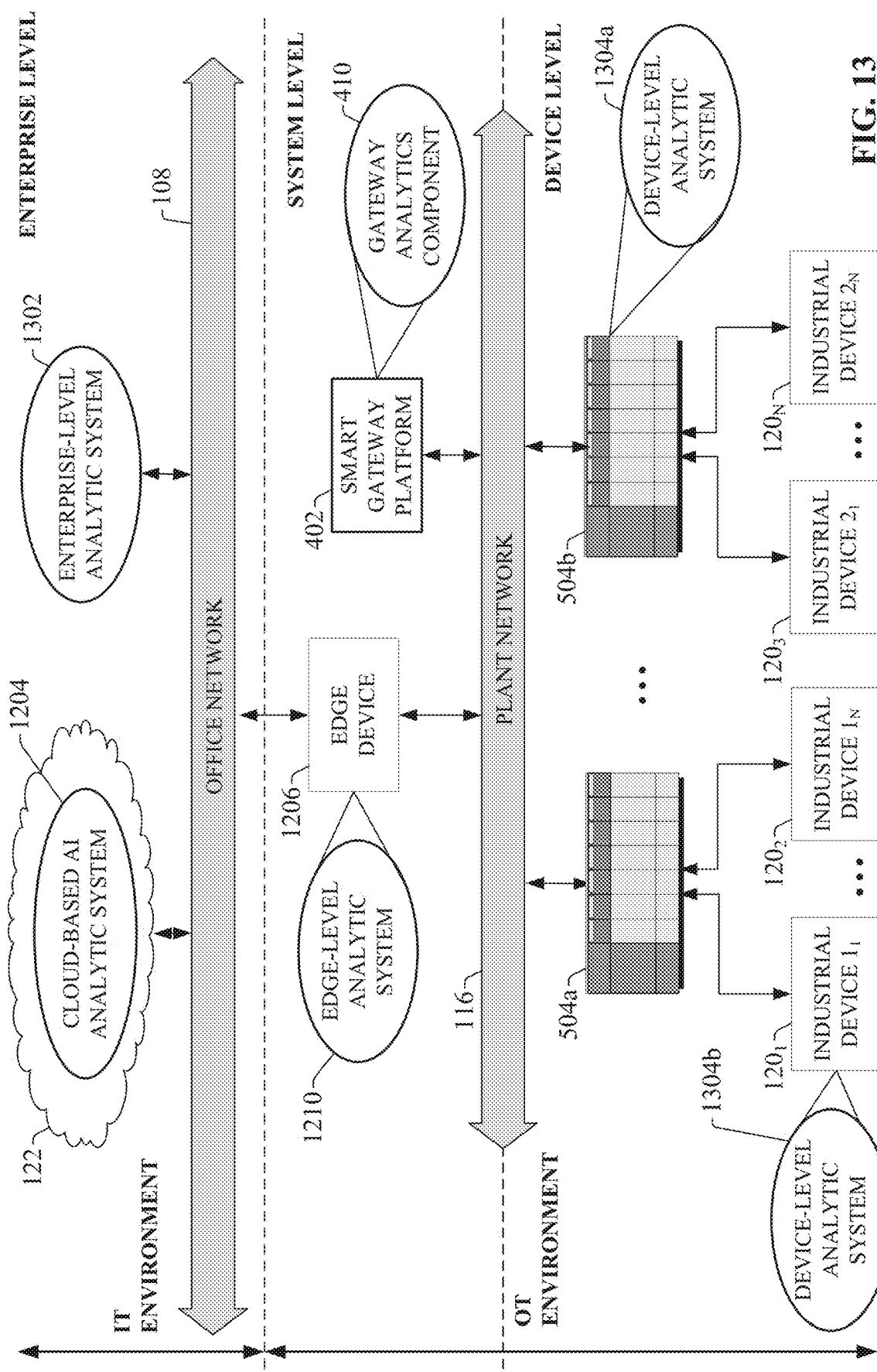
FIG. 13 is a diagram of an example scalable industrial analytics architecture.

In some scalable analytic architectures, analytics systems can also execute on the device level and on the enterprise level on a local network, in addition to the analytic systems that execute on the smart gateway platform 402, edge devices 1206, and cloud platforms. FIG. 13 is a diagram of an example scalable industrial analytics architecture. Such multi-level analytic architectures—with smart gateway platform 402 serving as a source of aggregated, normalized, and pre-modeled data—can be designed such that AI analytics are performed on a device or level of the industrial enterprise most relevant to the type of analytics being performed.

In this example architecture, the OT environment (as distinct from the IT environment) is defined to encompass the industrial devices, machines, lines industrial servers, and edge devices on the plant floor. Many of these OT devices and systems have significant native processing capabilities. Data functions such as transformation of raw industrial data from the industrial devices 504 (including industrial controllers and lower level industrial devices 120) into smart data, or performance of real-time analytics intended to regulate operation of the industrial devices 504, are best performed on the OT level; e.g., on the smart gateway platform 402, on the edge-level analytic system 1210, or on device-level analytic systems 1304. Real-time analytics are defined as analytics that occur in the OT domain that result in real-time actions, such as changing a set point of an industrial device or otherwise altering operation of an industrial process. Other higher level (enterprise level) analytics may be best suited for execution in the IT domain; e.g. by enterprise-level analytic systems 1302 or cloud-based analytics systems 1204. Analytics in the IT or cloud domain typically produce higher-level insights for visualization on client devices using dashboards or other visual presentations. Such higher-level analytics are referred to as non-real-time analytics since they do not typically result in immediate feedback control of industrial assets. Non-real-time analytics may also be referred to as human real-time analytics, as opposed to machine real-time analytics. For manufacturing plants with significant computing resources throughout the OT environment, a majority of data processing and value extraction is likely to occur in the OT environment. For field-based assets with limited computing resources, the majority of the data processing may instead occur on the cloud platform 122.

For simplicity, the example architecture depicted in FIG. 13 can be divided into three hierarchical levels: the device level, the system level, and the enterprise level. The enterprise level is part of the IT environment, while the device and system levels are part of the OT environment. Device-level analytics can perform such real-time functions as checking measured operating parameters against defined limits, which can provide useful insights into a device's operation. System-level analytics (e.g., performed by edge-level analytic system 1210 or gateway analytics component 410) can derive such insights relating to higher-level system operation, such as predicting that a trend in a paper web's tension is indicative of an impending web break within a few operating cycles. Operational insights obtained by device-level and system-level analytics, when implemented in controllers and industrial computers, enable real-time control actions intended to move system performance toward the business objective associated with model 702. In general, real-time analytics result from processing real-time data in the OT environment. At the enterprise level, selected contextualized or smart data from the OT environment can be analyzed and combined with data from other parts of the industrial enterprise to develop data presentations (e.g., dashboards or other visual presentations) that deliver actionable insights to a user via a client device.

This approach of locating data processing and analytics functions in a scalable manner is well-suited to industrial Internet-of-Things (IoT) applications with varying time domains of processing (e.g., milliseconds, seconds, minutes, hours, etc.), asset locations (centralized and remote), and system relationships (e.g., autonomous, in-line, buffered, batched, etc.). Analytics and AI/machine learning at each of these three defined levels can optimize processes and operations in industrial plants to achieve desired business objectives.

Within an architecture comprising one or more device-level, system-level, and enterprise-level analytics systems, a device-level or system-level analytic system can perform analytics on the device or system level when appropriate (e.g., on industrial controllers or other industrial devices 504, on low-level industrial devices 120, on edge devices 1206, etc.), and can shift analytics tasks to enterprise-level analytics systems to perform analytics scoped to the enterprise level as needed. Device-level analytic systems 1304 can perform local analytics on device data when device-level results are required. Device-level analytics performed by analytic systems 1304 can include, but are not limited to, determining whether a particular industrial device (e.g., a controller, sensor, drive, meter, etc.) is at risk of failure or should be replaced based on analysis of local data associated with that device (or data associated with a process or machine controlled by the device), determining a root cause of a device fault, etc.

Results of the device-level analytics can be consumed locally by the industrial device itself, or sent to a client device (e.g., as a notification or dashboard). For example, in response to a determination by a device-level analytic system 1304 that an industrial controller or device that hosts the analytic system 1304 is at risk of failure or an unacceptable loss of efficiency, and if the analytic system 1304 identifies an automated countermeasure that may mitigate or delay the device failure, analytic system 1304 can generate a control instruction that implements the countermeasure on the host device; e.g., by altering the device's operation in a manner that has a likelihood of mitigating the failure. Such countermeasures can include, but are not limited to, switching the device to a slow operation mode or stopped mode, switching the device to a backup power supply, changing a setpoint defined in the device, initiating execution of a different control program or sub-routine (in the case of industrial controllers or other programmable devices), or other such countermeasures.

In the case of system-level analytic systems 1210 or 410, risks associated with operation of more complex industrial automation systems—rather than a single device—can be monitored and identified, and appropriate countermeasures scoped to the entire automation system can be implemented. In an example scenario, if a system-level analytic system 1210 or 410 predicts—based on analysis of structured and contextualized data 704 prepared by the smart gateway platform 402—that a production line is at risk of producing an excessive amount of product waste (e.g., due to an increase in the number of part rejections, a discovered inefficiency in a process carried out by the production line, an indication of excessive wear on one or more devices that carry out the process, etc.), the system-level analytic system 1210, 410 can implement a multi-device countermeasure intended to mitigate the risk of product waste. This can involve generating multiple sets of instruction data directed to devices that make up the automation system, where the instructions are configured to alter operation of the target devices in a coordinated manner to effect the countermeasure on the automation system as a whole, thereby reducing the risk of product waste. Such system-wide countermeasures can include, for example, reducing the rate of production on a production line, switching production of the product to an alternative production line (which may involve sending instructions to control devices of the current production line to cease production, sending further instructions to the new production line to begin production, and sending still further instructions to appropriate upstream systems to begin providing material or parts to the new production line), sourcing a production line with parts from an alternate production line or source, or other such countermeasures.

In addition to monitoring devices and systems and implementing control modifications as needed, device-level and system-level analytic systems can also send analytic results to authorized client devices in the form of notifications, dashboards, or other graphical interfaces.

In addition, when appropriate, the device-level or system-level analytic systems can send results of local analytics to the enterprise-level analytic system 1302 or cloud-based analytic system 1204 for enterprise level analysis. The device-level and system-level analytic systems can also send results of local analytics to other device-level or system-level analytic systems on the same level or a different level of the enterprise. Analytic results sent from one of the analytic systems to another can be processed at the receiving system for further analytics. In this way, multi-level analytic systems can carry out inter-node collaborative analysis in connection with performing plant-level analytics, such that analytical tasks are carried out at the level of the enterprise deemed most suitable for the given analytical task. Analytics can also be scaled downward from higher levels to lower levels as appropriate.

In an example scenario, the decision to scale analytics upward or downward between analytic systems can be based on time-sensitivity of the analytics being performed. For example, if a system-level analytic system (e.g., edge-level analytic system 1210 or gateway analytics component 410) is performing analysis on a current production run of a product in which the result of the analytics may determine how the current run is to be executed, the system-level analytic system may shift at least a portion of the analytic processing to a device-level analytic system 1304 hosted on an industrial controller or another industrial device 504 that is part of the automation system executing the production run. By shifting relevant analytics to the device-level analytic system 1304 hosted on a controller or device that participates in the control process, the analytic result generated by the device-level analytic system 1304 can be leveraged more readily by the control devices that control the industrial process. In general, analytic systems can be configured to identify criteria indicating that data or analytic results are to be scaled or transferred to another analytic system; namely, the particular device, group of devices, industrial assets, or systems affected by a result of the analysis. The decision to send analytic results or other locally available data to another analytic system can be based on a determination of whether the result or data satisfies a criterion indicative of an importance or relevance of the result or data to another portion or layer of the overall enterprise architecture.

Figure 14:
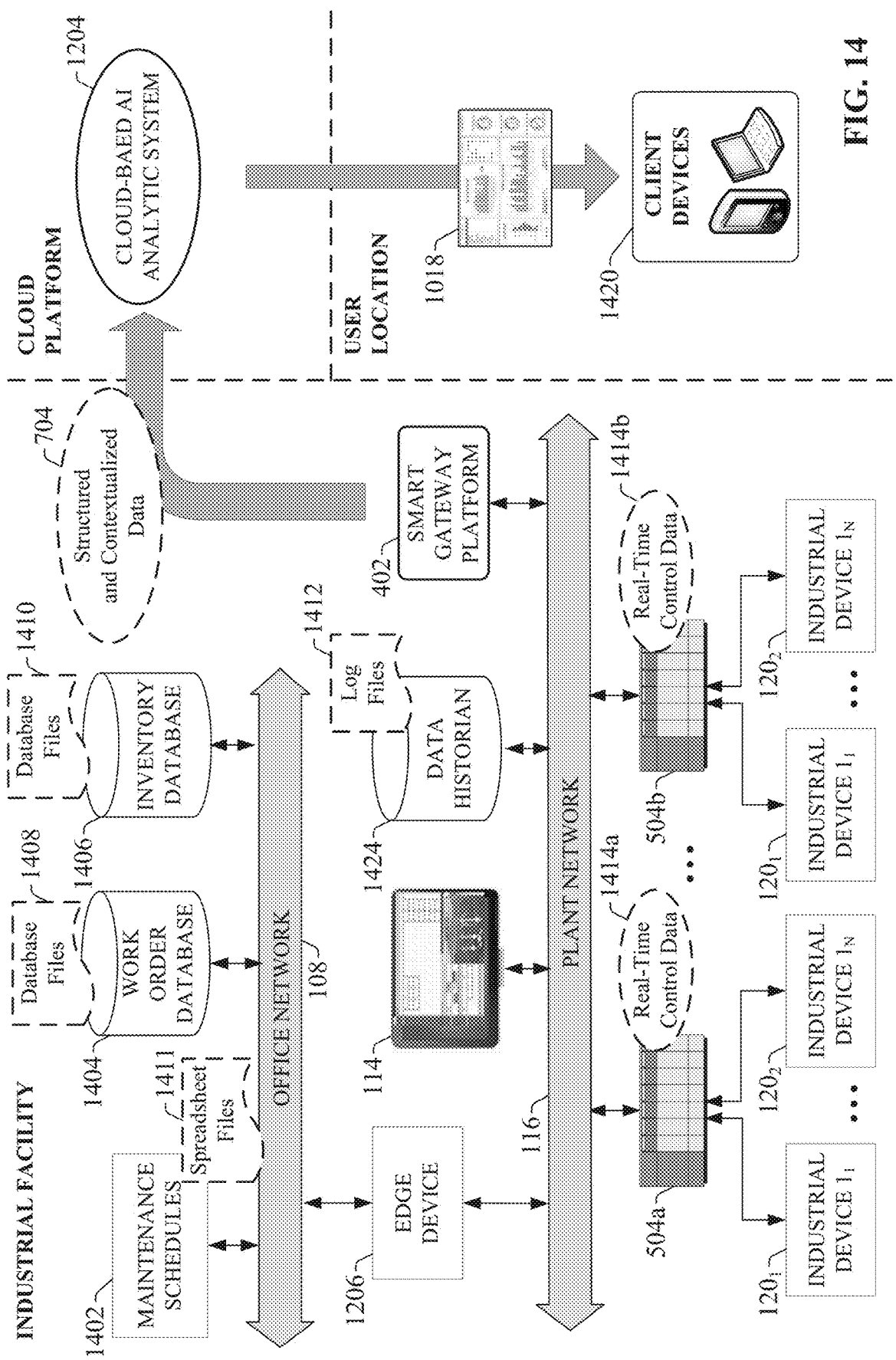
FIG. 14 is a diagram of an example industrial architecture in which a smart gateway platform feeds structured and contextualized data from disparate data sources throughout an industrial enterprise to a cloud-based analytic system executing on a cloud platform.

In addition to collection and modeling of raw and smart data from industrial devices, some embodiments of smart gateway platform 402 can also be configured to collect and model data from other types of data sources if dictated by the model 702 (that is, if the model 702 specifies that this supplemental data is useful for learning actionable insights into the business objective represented by the model 702). FIG. 14 is a diagram of an example industrial architecture in which a smart gateway platform 402 feeds structured and contextualized data 704 from disparate data sources throughout an industrial enterprise to a cloud-based analytic system 1204 executing on a cloud platform.

As described above, smart gateway platform 402 can normalize disparate structured and unstructured data, and model the data to encode relationships (correlations, causalities, etc.) between the data based on industry domain expertise encoded in the model 702. The platform 402 feeds this data 704 to AI analytic system 1204, which generates outcomes based on analysis of the structured and contextualized data 704. Data gathered by the smart gateway platform 402 can include both data from both plant floor devices and operational and supervisory software systems in the OT layer (e.g., MES systems, historians, inventory tracking systems, etc.). In the illustrated example, data collected by the smart gateway platform 402 for transformation and transmission to the cloud-based AI analytic system 1204 includes real-time control data 1414 generated by industrial devices 504. This real-time control data can include analog and digital data stored in the devices' data tables or associated with the devices' data tags. The control data can represent, for example, measured telemetry or sensor values read from a controlled industrial process (e.g., temperatures, pressures, flows, levels, speeds, etc.), measured digital values (e.g., part present sensor values, safety device statuses, switch settings, etc.), controlled analog and digital output values generated by the devices 504 and directed to industrial output devices of the controlled system, calculated performance metrics, etc.

Other data collected by the smart gateway platform 402 can include, but is not limited to, log files 1412 from a data historian device 1424 residing on the plant network 116, spreadsheet files 1411 stored on a maintenance schedule server 1402 (residing on office network 108) and containing information regarding maintenance schedules for various machines throughout the industrial facility, database files 1408 stored on a work order database 1404 and containing work order information relating to products produced at the industrial facility, database files 1410 stored on an inventory database 1406 and containing information regarding current and/or expected product availability, or other such data files. Although the present example presumes specific types of information contained in these respective data file types—e.g., maintenance schedule information stored as spreadsheet files 1411, work order information stored in database files 1408, etc.—it is to be appreciated that these information types are only intended to be exemplary, and that other types of information can be stored in the various file types. These diverse sets of data can be collected and transformed by smart gateway platform 402 in accordance with model 702 (specifying the desired business objective) and sent to the cloud-based analytic system 1204 as structured and contextualized data 704.

Since the smart gateway platform 402 normalizes and models the data collected from industrial devices 504, the platform 402 can present the resulting structured and contextualized data 704 in a consistent model that can be automatically discovered by software applications—e.g., AI or machine learning analytic systems—designed to consume this data. This can greatly simplify acquisition and analytics of data relevant to a desired business objective. By referencing a customized model 702 that defines data items (e.g., sensory inputs, key performance indicators, machine statuses, etc.) that are relevant to a desired industry- and machine-specific business objective (e.g., minimization of machine downtime, optimization of operation efficiency, etc.), the smart gateway platform 402 can significantly reduce the amount of storage required for data collection and analysis relative to streaming and storing all available time-series data from the plant floor. Smart gateway platform 402 also uses the model 702 to predefined and preformat data for consumption by higher level analytic models (e.g., high level object-oriented models) and analytics software. Moreover, integration of containerized software and micro-services with the smart gateway platform 402 can add new value at the edge by further modeling, persisting, and analyzing the data for business value.

Figure 15:
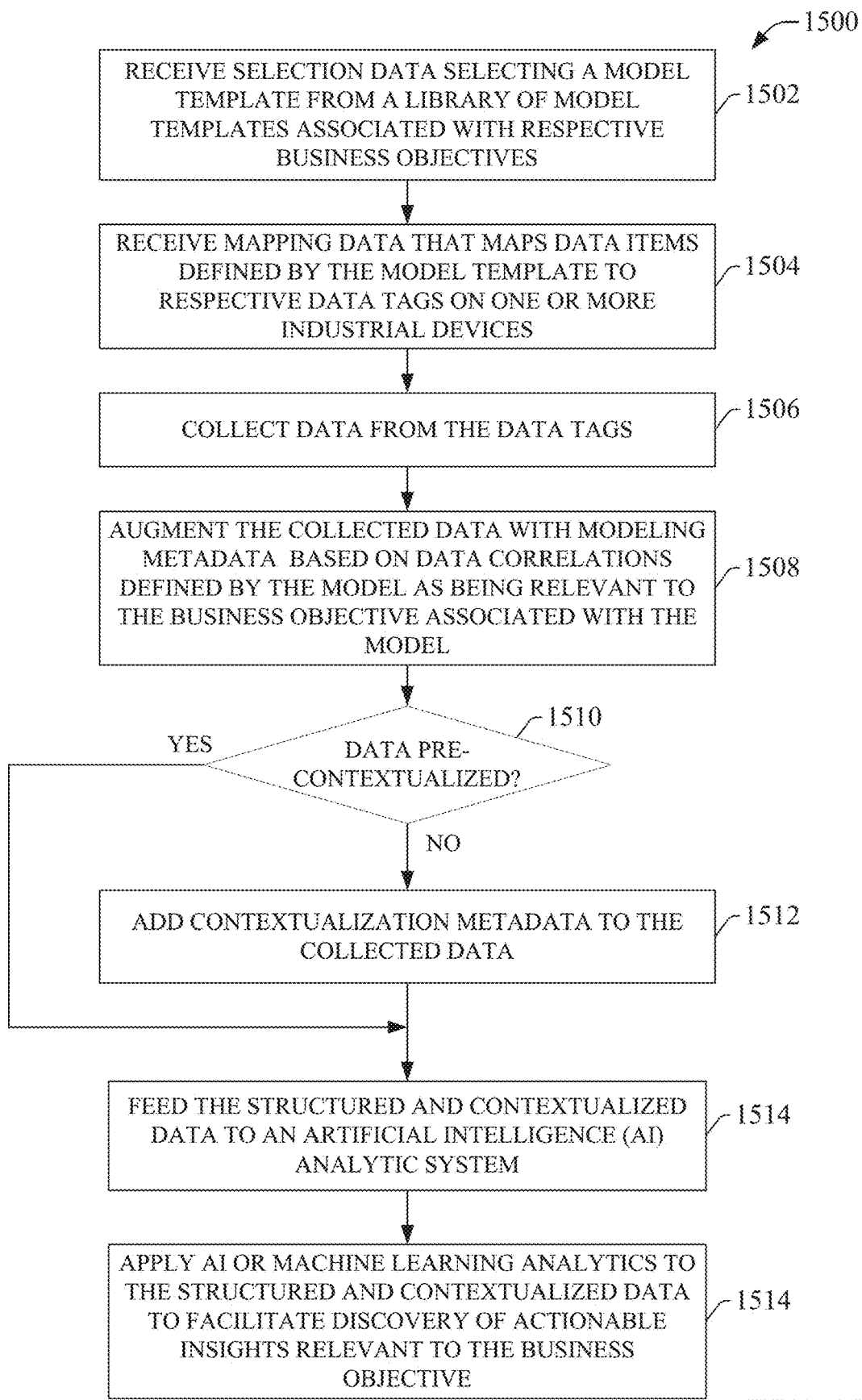
FIG. 15 is a flowchart of an example methodology for structuring industrial data and performing data analytics on the structured data to yield actionable insights relative to a desired business objective.

FIG. 15 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for structuring industrial data and performing data analytics on the structured data to yield actionable insights relative to a desired business objective. Initially, at 1502, selection data is received that selects a model template from a library of model templates associated with respective business objectives. The library of model templates can be stored on a smart gateway platform. Each model template can define, for a given business objective, a set of data items (e.g., sensor inputs, controller data tags, motor drive data tags, etc.) relevant to determining actionable insights into the associated business objective, as well as relationships (e.g., correlations, causalities, etc.) between the data items. The data items and the relationships therebetween are based on domain expertise or knowledge encoded into the model templates. Example business objectives for which model templates may be made available can include, but are not limited to, minimizing machine downtime, determining a cause of machine downtime, predicting machine downtime, increasing product output, optimizing energy efficiency, improving product quality, or other such objectives.

At 1504, mapping data is received at the smart gateway platform that maps the data items defined by the model template selected at step 1502 to respective data tags on one or more industrial devices. The data tags to which the data items are mapped may be standard industrial data tags or may be smart tags that store smart data that has been pre-contextualized by its associated smart industrial device.

At 1506, data is collected from the data tags by the smart gateway platform. In contrast to conventional big data analytic systems, only the data streams considered relevant to the desired business objective associated with the selected model template are collected. At 1508, the data items collected at step 1506 are augmented with modeling metadata based on data correlations defined by the model as being relevant to the business objective associated with the model. This can include, for example, adding metadata to respective data items to define the associated data value's mathematical relationship to other data items, as determined based on the relationships defined by the model. Metadata may also be added that defines the type of analytic problem (e.g., modeling, clustering, optimization, minimization, etc.) to be solved by subsequent AI analysis of the data, which is a function of the specific business objective for which actionable insights are desired. This augmentation step can also include normalization of the data items to a common format in preparation for collective AI analysis.

At 1510, a determination is made as to whether the data collected at step 1506 is pre-contextualized smart data from a smart industrial device. Such smart devices may be configured to pre-contextualize data items generated by the device with contextualization metadata that provides additional information regarding the context under which the data values were generated. This contextualization metadata may include, for example, an operating state of a machine at the time the data value was generated (e.g., running, idle, faulted, etc.), power statistics at the time the data was generated (e.g., voltages, currents, power consumption, etc.), or other such contextual metadata that may impart greater informational value to the data item.

If an item of the data collected at step 1506 is not pre-contextualized (NO at step 1510), the methodology proceeds to step 1512, where contextualization metadata is added to the data item by the smart gateway platform. In various embodiments, the smart gateway platform can select relevant items of contextualization data based on the model template selected at step 1502, or based on a model of the industrial enterprise that defines functional relationships between machines and devices.

If the data is already pre-contextualized (YES at step 1510), the methodology proceeds to step 1514 without adding contextualization metadata. At 1514, the structured and contextualized data resulting from steps 1508-1512 is fed to an artificial intelligence analytic system. At 1516, AI or machine learning analytics are applied to the structured and contextualized data to facilitate discovery of actionable insights relevant to the desired business objective. In some alternative embodiments, the structured and contextualized data can be fed to other types of analytics systems (e.g., a statistical analysis system) instead of an AI analytic system.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
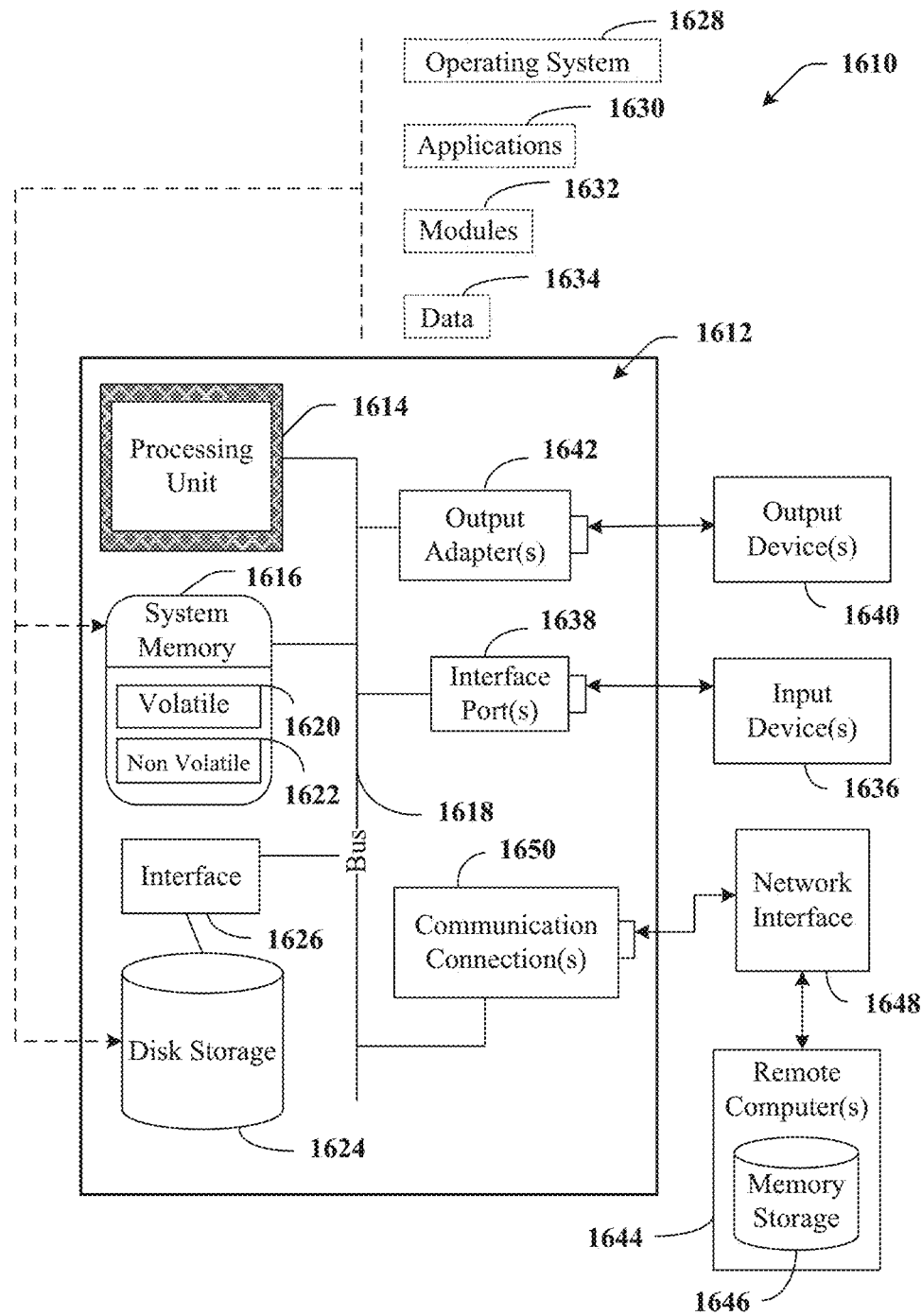
FIG. 16 is an example computing environment.
Figure 17:
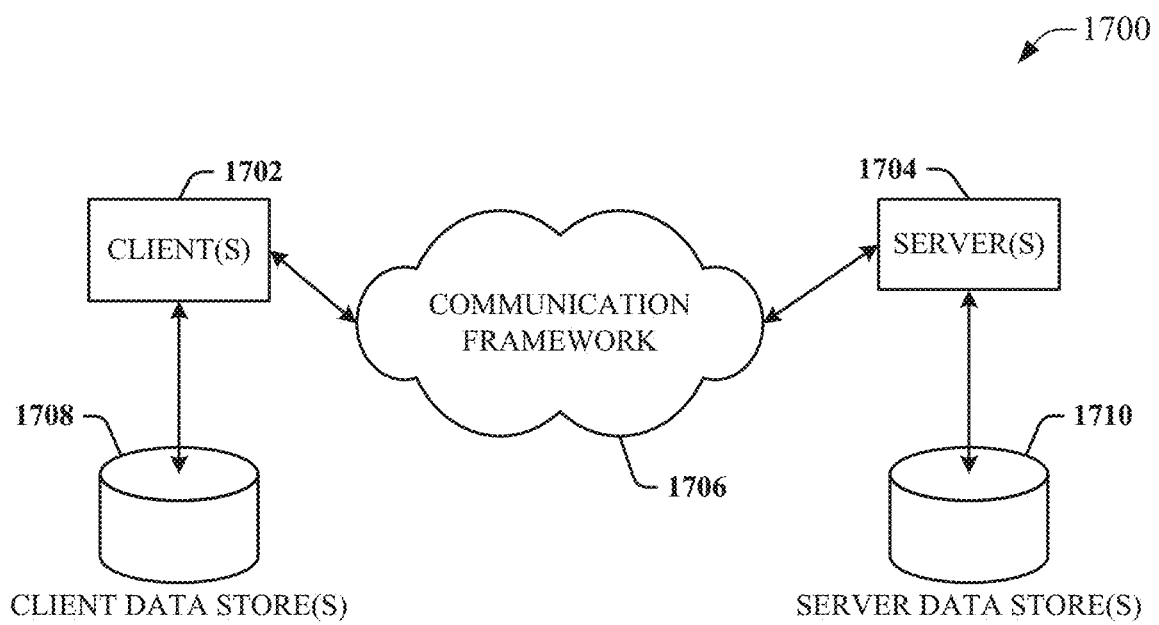
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1648 can also encompass near field communication (NFC) or Bluetooth communication.

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A smart gateway platform, comprising:
   a memory that stores executable components and model templates associated with respective industrial business objectives; and
   a processor, operatively coupled to the memory, that executes the executable components, the executable components comprising:
      a user interface component configured to receive selection data selecting a model template, of the model templates, associated with a business objective of the business objectives, wherein the model template defines
         a key variable relating to the business objective and a mathematical relationship between the key variable and correlated variables, and
         a type of analytic problem that, when applied by an analytics system to the key variable and the correlated variables based on the mathematical relationship, produces output data relating to the business objective;
      a device interface component configured to identify data tags of industrial devices corresponding to the key variable and the correlated variables, and collect data values from the data tags;
      a data modeling component configured to normalize the data values and add modeling metadata to the data values based on the model template to yield structured data, wherein the modeling metadata comprises a first metadata field identifying a data value as the key variable, one or more second metadata fields identifying data values corresponding to the correlated variables, a third metadata field defining the mathematical relationship, and a fourth metadata field identifying the type of analytic problem; and
      an analytics interface component configured to send the structured data to the analytics system.

2. The smart gateway platform of claim 1, wherein the business objective is at least one of maximization of product output, minimization of machine downtime, minimization of machine faults, optimization of energy consumption, prediction of machine downtime events, determination of a cause of a machine downtime, maximization of product quality, minimization of emissions, identification of factors that yield maximum product quality, identification of factors that yield maximum product output, or identification of factors that yield minimal machine downtime.

3. The smart gateway platform of claim 2, wherein the user interface component is configured to categorize the model templates according to at least one of an industry, a vertical, a machine type, or a type of industrial application.

4. The smart gateway platform of claim 1, wherein the analytics system is configured to perform analytics on the structured data and generate an actionable insight relating to the business objective based on a result of the analytics and to render the actionable insight on a client device.

5. The smart gateway platform of claim 4, wherein the analytics system is configured to generate a control output directed to one or more of the industrial devices based on the result of the analytics, and wherein the control output is configured to transition operation of an industrial asset toward the business objective.

6. The smart gateway platform of claim 1, wherein the data modeling component is further configured to, in response to determining that a data value, of the data values, is not pre-contextualized, add contextualization metadata to the data value.

7. The smart gateway platform of claim 6, wherein the contextualization metadata comprises information regarding at least one of a state of a machine at a time that the data value was generated or an electrical statistic at the time that the data value was generated.

8. The smart gateway platform of claim 1, wherein the analytics interface component is configured to select the analytics system from multiple analytics systems residing on different levels of an industrial enterprise.

9. A method, comprising:
   receiving, by a smart gateway platform comprising a processor, selection data that identifies a model template specific to a business objective from a set of stored model templates associated with respective business objectives, wherein the model template defines:
      a key variable relating to the business objective and a mathematical relationship between the key variable and correlated variables, and
      a type of analytic problem that, when applied by an analytics system to the key variable and the correlated variables based on the mathematical relationship, produces output data relating to the business objective;
   identifying, by the smart gateway platform, data tags of industrial devices corresponding to the key variable and the correlated variables;
   collecting, by the smart gateway platform, data items from the data tags;
   normalizing, by the smart gateway platform, the data items;
   adding, by the smart gateway platform, modeling metadata to the data items based on the model template to yield structured data, wherein the modeling metadata comprises a first metadata field that identifies a data item as the key variable, one or more second metadata fields that identify data items corresponding to the correlated variables, a third metadata field that defines the mathematical relationship, and a fourth metadata field that identifies the type of analytic problem; and
   sending, by the smart gateway platform, the structured data to the analytics system.

10. The method of claim 9, wherein the business objective is at least one of maximization of product output, minimization of machine downtime, minimization of machine faults, optimization of energy consumption, prediction of machine downtime events, determination of a cause of a machine downtime, maximization of product quality, minimization of emissions, identification of factors that yield maximum product quality, identification of factors that yield maximum product output, or identification of factors that yield minimal machine downtime.

11. The method of claim 10, further comprising classifying, by the smart gateway platform, the set of model templates according to at least one of an industry, a vertical, a machine type, or a type of industrial application.

12. The method of claim 9, further comprising:
   performing data analysis on the structured data;
   determining an actionable insight relating to the business objective based on a result of the data analysis; and
   rendering the actionable insight on a client device.

13. The method of claim 12, further comprising generating a control output directed to one or more of the industrial devices based on the result of the data analysis, wherein the control output is configured to alter operation of an industrial system in accordance with the business objective.

14. A non-transitory computer-readable medium having stored thereon instructions that, in response to execution, cause a system comprising a processor to perform operations, the operations comprising:
  receiving selection input that specifies a model template corresponding to an industrial business objective from a set of stored model templates, wherein the set of stored model templates are associated with respective industrial business objectives, and the model template defines:
    a key variable relating to the business objective and a mathematical relationship between the key variable and correlated variables, and
    a type of analytic problem that, in response to application by an analytics system to the key variable and the correlated variables based on the mathematical relationship, produces output data relating to the business objective;
  identifying data tags of industrial devices corresponding to the key variable and the correlated variables;
  collecting data values from the data tags;
  normalizing the data items;
  appending modeling metadata to the data values based on the model template to yield structured data, wherein the modeling metadata comprises a first metadata field identifying a data value as the key variable, one or more second metadata fields identifying data values corresponding to the correlated variables, a third metadata field defining the mathematical relationship, and a fourth metadata field identifying the type of analytic problem; and
  sending the structured data to an artificial intelligence analytics system.

15. The non-transitory computer-readable medium of claim 14, wherein the business objective is at least one of maximization of product output, minimization of machine downtime, minimization of machine faults, optimization of energy consumption, prediction of machine downtime events, determination of a cause of a machine downtime, maximization of product quality, minimization of emissions, identification of factors that yield maximum product quality, identification of factors that yield maximum product output, or identification of factors that yield minimal machine downtime.

16. The non-transitory computer-readable medium of claim 14, wherein the operations further comprise classifying the set of stored model templates according to at least one of an industry, a vertical, a machine type, or a type of industrial application.

17. The non-transitory computer-readable medium of claim 14, wherein the operations further comprise:
  performing data analysis on the structured data;
  determining an actionable insight relating to the business objective based on a result of the data analysis; and
  rendering the actionable insight on a client device.

18. The non-transitory computer-readable medium of claim 17, wherein the operations further comprise generating a control output directed to one or more of the industrial devices based on the result of the data analysis, the control output configured to alter operation of an industrial system in accordance with the business objective.

19. The smart gateway platform of claim 1, further comprising a model configuration component configured to customize the model template in accordance with mapping data received by the user interface component that defines a first mapping between the key variable and a data tag corresponding to the key variable and second mappings between the correlated variables and data tags corresponding to the correlated variables.

20. The method of claim 1, further comprising:
  receiving, by the smart gateway platform, mapping data that defines a first mapping between the key variable and a data tag corresponding to the key variable and second mappings between the correlated variables and data tags corresponding to the correlated variables; and
  customizing, by the smart gateway platform, the model template in accordance with the mapping data.

* * * * *